US008083152B2

(12) United States Patent
Theodossiou

(10) Patent No.: US 8,083,152 B2
(45) **Date of Patent: *Dec. 27, 2011**

(54) LASER ETCHED SECURITY FEATURES FOR IDENTIFICATION DOCUMENTS AND METHODS OF MAKING SAME

(75) Inventor: George Theodossiou, Brockton, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/706,333

(22) Filed: Feb. 16, 2010

(65) Prior Publication Data

US 2010/0258636 A1 Oct. 14, 2010

Related U.S. Application Data

(63) Continuation of application No. 11/737,533, filed on Apr. 19, 2007, now Pat. No. 7,661,600, which is a continuation of application No. 10/330,033, filed on Dec. 24, 2002, now Pat. No. 7,207,494.

(60) Provisional application No. 60/344,716, filed on Dec. 24, 2001.

(51) Int. Cl.
*G06K 19/06* (2006.01)

(52) U.S. Cl. ......................... 235/492; 235/487; 235/380

(58) Field of Classification Search .................. 235/492, 235/488, 487, 380, 382
See application file for complete search history.

(56) References Cited

U.S. PATENT DOCUMENTS

| | | | |
|---|---|---|---|
| 2,815,310 | A | 12/1957 | Anderson |
| 2,957,830 | A | 10/1960 | Goldberg |
| 3,153,166 | A | 10/1964 | Thorton, Jr. et al. |
| 3,225,457 | A | 12/1965 | Schure |
| 3,238,595 | A | 3/1966 | Schwartz |
| 3,413,171 | A | 11/1968 | Hannon |
| 3,496,262 | A | 2/1970 | Long et al. |
| 3,571,957 | A | 3/1971 | Cumming et al. |
| 3,582,439 | A | 6/1971 | Thomas |
| 3,601,913 | A | 8/1971 | Pollock |
| 3,614,430 | A | 10/1971 | Berler |
| 3,614,839 | A | 10/1971 | Thomas |
| 3,640,009 | A | 2/1972 | Komiyama |
| 3,647,275 | A | 3/1972 | Ward |
| 3,758,970 | A | 9/1973 | Annenberg |
| 3,802,101 | A | 4/1974 | Scantlin |
| 3,860,558 | A | 1/1975 | Klemchuk |
| 3,914,484 | A | 10/1975 | Creegan et al. |
| 3,929,701 | A | 12/1975 | Hall et al. |

(Continued)

FOREIGN PATENT DOCUMENTS

CA 2470094 6/2003

(Continued)

OTHER PUBLICATIONS

U.S. Appl. No. 60/344,673, filed Jul. 8, 2004, Howard et al.

(Continued)

*Primary Examiner* — Karl D. Frech

(74) *Attorney, Agent, or Firm* — Mintz, Levin, Cohn, Ferris, Glovsky and Popeo, P.C.

(57) ABSTRACT

Identification documents employing laser-etched or -engraved features are detailed, together with methods for their manufacture. Tactile effects produced by the laser-processed features may be felt by touch, helping confirm the authenticity of such documents.

12 Claims, 5 Drawing Sheets

U.S. PATENT DOCUMENTS

| | | | |
|---|---|---|---|
| 3,932,036 | A | 1/1976 | Ueda et al. |
| 3,949,501 | A | 4/1976 | Andrews et al. |
| 3,953,869 | A | 4/1976 | Wah Lo et al. |
| 3,961,956 | A | 6/1976 | Fukuda et al. |
| 3,975,291 | A | 8/1976 | Claussen et al. |
| 3,987,711 | A | 10/1976 | Silver |
| 4,035,740 | A | 7/1977 | Schafer et al. |
| 4,051,374 | A | 9/1977 | Drexhage et al. |
| 4,072,911 | A | 2/1978 | Walther et al. |
| 4,082,873 | A | 4/1978 | Williams |
| 4,096,015 | A | 6/1978 | Kawamata et al. |
| 4,100,509 | A | 7/1978 | Walther et al. |
| 4,104,555 | A | 8/1978 | Fleming |
| 4,119,361 | A | 10/1978 | Greenaway |
| 4,121,003 | A | 10/1978 | Williams |
| 4,131,337 | A | 12/1978 | Moraw et al. |
| 4,155,618 | A | 5/1979 | Regnault et al. |
| 4,171,766 | A | 10/1979 | Ruell |
| 4,183,989 | A | 1/1980 | Tooth |
| 4,184,701 | A | 1/1980 | Franklin et al. |
| 4,256,900 | A | 3/1981 | Raue |
| 4,270,130 | A | 5/1981 | Houle et al. |
| 4,271,395 | A | 6/1981 | Brinkmann et al. |
| 4,274,062 | A | 6/1981 | Brinkmann et al. |
| 4,289,957 | A | 9/1981 | Neyroud et al. |
| 4,301,091 | A | 11/1981 | Schieder et al. |
| 4,304,809 | A | 12/1981 | Moraw et al. |
| 4,313,984 | A | 2/1982 | Moraw et al. |
| 4,317,782 | A | 3/1982 | Eckstein et al. |
| 4,324,421 | A | 4/1982 | Moraw et al. |
| 4,326,066 | A | 4/1982 | Eckstein et al. |
| 4,338,258 | A | 7/1982 | Brinkwerth et al. |
| 4,356,052 | A | 10/1982 | Moraw et al. |
| 4,359,633 | A | 11/1982 | Bianco |
| 4,384,973 | A | 5/1983 | Harnisch |
| 4,415,225 | A | 11/1983 | Benton et al. |
| 4,417,784 | A | 11/1983 | Knop et al. |
| 4,428,997 | A | 1/1984 | Shulman |
| 4,443,438 | A | 4/1984 | Kasamatsu et al. |
| 4,450,024 | A | 5/1984 | Haghiri-Tehrani et al. |
| 4,467,209 | A | 8/1984 | Maurer et al. |
| 4,468,468 | A | 8/1984 | Benninghoven et al. |
| 4,506,148 | A | 3/1985 | Berthold et al. |
| 4,507,346 | A | 3/1985 | Maurer et al. |
| 4,510,311 | A | 4/1985 | Eckstein |
| 4,522,881 | A | 6/1985 | Kobayashi et al. |
| 4,523,777 | A | 6/1985 | Holbein et al. |
| 4,527,059 | A | 7/1985 | Benninghoven et al. |
| 4,529,992 | A | 7/1985 | Ishida et al. |
| 4,544,181 | A | 10/1985 | Maurer et al. |
| 4,551,265 | A | 11/1985 | Brinkwerth et al. |
| 4,568,824 | A | 2/1986 | Gareis et al. |
| 4,579,754 | A | 4/1986 | Maurer et al. |
| 4,590,366 | A | 5/1986 | Rothfjell |
| 4,596,409 | A | 6/1986 | Holbein et al. |
| 4,597,592 | A | 7/1986 | Maurer et al. |
| 4,597,593 | A | 7/1986 | Maurer |
| 4,599,259 | A | 7/1986 | Kobayashi et al. |
| 4,617,216 | A | 10/1986 | Haghiri-Tehrani et al. |
| 4,621,271 | A | 11/1986 | Brownstein |
| 4,627,997 | A | 12/1986 | Ide |
| 4,629,215 | A | 12/1986 | Maurer et al. |
| 4,638,289 | A | 1/1987 | Zottnik |
| 4,652,722 | A | 3/1987 | Stone et al. |
| 4,653,775 | A | 3/1987 | Raphael et al. |
| 4,653,862 | A | 3/1987 | Morozumi |
| 4,654,290 | A | 3/1987 | Spanjer |
| 4,656,585 | A | 4/1987 | Stephenson |
| 4,663,518 | A | 5/1987 | Borror et al. |
| 4,670,882 | A | 6/1987 | Telle et al. |
| 4,672,891 | A | 6/1987 | Maurer et al. |
| 4,675,746 | A | 6/1987 | Tetrick et al. |
| 4,687,526 | A | 8/1987 | Wilfert |
| 4,689,477 | A | 8/1987 | Goldman |
| 4,709,384 | A | 11/1987 | Schiller |
| 4,711,690 | A | 12/1987 | Haghiri-Tehrani |
| 4,732,410 | A | 3/1988 | Holbein et al. |
| 4,735,670 | A | 4/1988 | Maurer et al. |
| 4,738,949 | A | 4/1988 | Sethi et al. |
| 4,748,452 | A | 5/1988 | Maurer |
| 4,751,525 | A | 6/1988 | Robinson |
| 4,754,128 | A | 6/1988 | Takeda et al. |
| 4,765,636 | A | 8/1988 | Speer |
| 4,765,656 | A | 8/1988 | Becker et al. |
| 4,766,026 | A | 8/1988 | Lass et al. |
| 4,773,677 | A | 9/1988 | Plasse |
| 4,790,566 | A | 12/1988 | Boissier et al. |
| 4,803,114 | A | 2/1989 | Schledorn |
| 4,816,372 | A | 3/1989 | Schenk et al. |
| 4,816,374 | A | 3/1989 | Lecomte |
| 4,822,973 | A | 4/1989 | Fahner et al. |
| 4,841,134 | A | 6/1989 | Hida et al. |
| 4,859,361 | A | 8/1989 | Reilly et al. |
| 4,861,620 | A | 8/1989 | Azuma et al. |
| 4,866,025 | A | 9/1989 | Byers et al. |
| 4,866,027 | A | 9/1989 | Henzel |
| 4,869,946 | A | 9/1989 | Clay |
| 4,871,714 | A | 10/1989 | Byers et al. |
| 4,876,234 | A | 10/1989 | Henzel |
| 4,876,237 | A | 10/1989 | Byers et al. |
| 4,878,167 | A | 10/1989 | Kapulka et al. |
| 4,879,747 | A | 11/1989 | Leighton et al. |
| 4,889,749 | A | 12/1989 | Ohashi et al. |
| 4,891,351 | A | 1/1990 | Byers et al. |
| 4,894,110 | A | 1/1990 | Lass et al. |
| 4,931,793 | A | 6/1990 | Fuhrmann et al. |
| 4,935,335 | A | 6/1990 | Fotland |
| 4,959,406 | A | 9/1990 | Foltin et al. |
| 4,968,063 | A | 11/1990 | McConville et al. |
| 4,972,476 | A | 11/1990 | Nathans |
| 4,990,759 | A | 2/1991 | Gloton et al. |
| 4,994,831 | A | 2/1991 | Marandi |
| 4,999,065 | A | 3/1991 | Wilfert |
| 5,005,872 | A | 4/1991 | Lass et al. |
| 5,005,873 | A | 4/1991 | West |
| 5,006,503 | A | 4/1991 | Byers et al. |
| 5,011,816 | A | 4/1991 | Byers et al. |
| 5,013,900 | A | 5/1991 | Hoppe |
| 5,024,989 | A | 6/1991 | Chiang et al. |
| 5,051,147 | A | 9/1991 | Anger |
| 5,058,926 | A | 10/1991 | Drower |
| 5,060,981 | A | 10/1991 | Fossum et al. |
| 5,061,341 | A | 10/1991 | Kildal et al. |
| 5,062,341 | A | 11/1991 | Reiling et al. |
| 5,066,947 | A | 11/1991 | Du Castel |
| 5,075,195 | A | 12/1991 | Babler et al. |
| 5,079,411 | A | 1/1992 | Lee |
| 5,087,507 | A | 2/1992 | Heinzer |
| 5,089,350 | A | 2/1992 | Talvalkar et al. |
| 5,099,422 | A | 3/1992 | Foresman et al. |
| 5,100,711 | A | 3/1992 | Satake et al. |
| 5,113,445 | A | 5/1992 | Wang |
| 5,122,813 | A | 6/1992 | Lass et al. |
| 5,128,779 | A | 7/1992 | Mallik |
| 5,128,859 | A | 7/1992 | Carbone et al. |
| 5,138,070 | A | 8/1992 | Berneth |
| 5,138,604 | A | 8/1992 | Umeda et al. |
| 5,156,938 | A | 10/1992 | Foley et al. |
| 5,157,424 | A | 10/1992 | Craven et al. |
| 5,169,707 | A | 12/1992 | Faykish et al. |
| 5,171,625 | A | 12/1992 | Newton |
| 5,172,281 | A | 12/1992 | Ardis et al. |
| 5,173,840 | A | 12/1992 | Kodai et al. |
| 5,179,392 | A | 1/1993 | Kawaguchi |
| 5,180,309 | A | 1/1993 | Egnor |
| 5,191,522 | A | 3/1993 | Bosco et al. |
| 5,201,044 | A | 4/1993 | Frey, Jr. et al. |
| 5,208,450 | A | 5/1993 | Uenishi et al. |
| 5,215,864 | A | 6/1993 | Laakmann |
| 5,216,543 | A | 6/1993 | Calhoun |
| 5,224,173 | A | 6/1993 | Kuhns et al. |
| 5,233,513 | A | 8/1993 | Doyle |
| 5,237,164 | A | 8/1993 | Takada |
| 5,243,524 | A | 9/1993 | Ishida et al. |
| 5,249,546 | A | 10/1993 | Pennelle |
| 5,261,987 | A | 11/1993 | Luening et al. |
| 5,267,755 | A | 12/1993 | Yamauchi et al. |

| | | | |
|---|---|---|---|
| 5,270,526 | A | 12/1993 | Yoshihara |
| 5,272,039 | A | 12/1993 | Yoerger |
| 5,276,478 | A | 1/1994 | Morton |
| 5,284,364 | A | 2/1994 | Jain |
| 5,294,774 | A | 3/1994 | Stone |
| 5,294,944 | A | 3/1994 | Takeyama et al. |
| 5,298,922 | A | 3/1994 | Merkle et al. |
| 5,301,981 | A | 4/1994 | Nesis |
| 5,304,513 | A | 4/1994 | Haghiri-Tehrani et al. |
| 5,304,789 | A | 4/1994 | Lob et al. |
| 5,308,736 | A | 5/1994 | Defieuw et al. |
| 5,317,503 | A | 5/1994 | Inoue |
| 5,319,453 | A | 6/1994 | Copriviza et al. |
| 5,321,751 | A | 6/1994 | Ray et al. |
| 5,334,573 | A | 8/1994 | Schild |
| 5,336,657 | A | 8/1994 | Egashira et al. |
| 5,337,361 | A | 8/1994 | Wang et al. |
| 5,351,302 | A | 9/1994 | Leighton et al. |
| 5,374,675 | A | 12/1994 | Plachetta et al. |
| 5,379,345 | A | 1/1995 | Greenberg |
| 5,380,044 | A | 1/1995 | Aitkens et al. |
| 5,380,695 | A | 1/1995 | Chiang et al. |
| 5,384,846 | A | 1/1995 | Berson et al. |
| 5,386,566 | A | 1/1995 | Hamanaka et al. |
| 5,387,013 | A | 2/1995 | Yamauchi et al. |
| 5,393,099 | A | 2/1995 | D'Amato |
| 5,394,555 | A | 2/1995 | Hunter et al. |
| 5,396,559 | A | 3/1995 | McGrew |
| 5,409,797 | A | 4/1995 | Hosoi et al. |
| 5,410,142 | A | 4/1995 | Tsuboi et al. |
| 5,421,619 | A | 6/1995 | Dyball |
| 5,421,869 | A | 6/1995 | Gundjian et al. |
| 5,422,213 | A | 6/1995 | Yu et al. |
| 5,422,230 | A | 6/1995 | Boggs et al. |
| 5,424,119 | A | 6/1995 | Phillips et al. |
| 5,434,994 | A | 7/1995 | Shaheen et al. |
| 5,435,599 | A | 7/1995 | Bernecker |
| 5,436,970 | A | 7/1995 | Ray et al. |
| 5,446,659 | A | 8/1995 | Yamawaki |
| 5,449,200 | A | 9/1995 | Andric et al. |
| 5,450,504 | A | 9/1995 | Calia |
| 5,451,478 | A | 9/1995 | Boggs et al. |
| 5,454,598 | A | 10/1995 | Wicker |
| 5,455,947 | A | 10/1995 | Suzuki et al. |
| 5,458,713 | A | 10/1995 | Ojster |
| 5,463,212 | A | 10/1995 | Oshima et al. |
| 5,466,012 | A | 11/1995 | Puckett et al. |
| 5,471,533 | A | 11/1995 | Wang et al. |
| 5,474,875 | A | 12/1995 | Loerzer et al. |
| 5,483,442 | A | 1/1996 | Black et al. |
| 5,483,632 | A | 1/1996 | Kuwamoto et al. |
| 5,489,639 | A | 2/1996 | Faber et al. |
| 5,490,217 | A | 2/1996 | Wang et al. |
| 5,499,330 | A | 3/1996 | Lucas et al. |
| 5,504,674 | A | 4/1996 | Chen et al. |
| 5,505,494 | A | 4/1996 | Belluci et al. |
| 5,509,693 | A | 4/1996 | Kohls |
| 5,514,860 | A | 5/1996 | Berson |
| 5,516,362 | A | 5/1996 | Gundjian et al. |
| 5,522,623 | A | 6/1996 | Soules et al. |
| 5,523,125 | A | 6/1996 | Kennedy et al. |
| 5,523,942 | A | 6/1996 | Tyler et al. |
| 5,524,489 | A | 6/1996 | Twigg |
| 5,525,403 | A | 6/1996 | Kawabata et al. |
| 5,529,345 | A | 6/1996 | Kohls |
| 5,532,104 | A | 7/1996 | Goto |
| 5,534,372 | A | 7/1996 | Koshizuka et al. |
| 5,550,346 | A | 8/1996 | Andriash et al. |
| 5,550,976 | A | 8/1996 | Henderson et al. |
| 5,560,799 | A | 10/1996 | Jacobsen |
| 5,573,584 | A | 11/1996 | Ostertag et al. |
| 5,576,377 | A | 11/1996 | El Sayed et al. |
| 5,579,694 | A | 12/1996 | Mailloux |
| 5,586,310 | A | 12/1996 | Sharman |
| 5,629,093 | A | 5/1997 | Bischof et al. |
| 5,629,512 | A | 5/1997 | Haga |
| 5,633,119 | A | 5/1997 | Burberry et al. |
| 5,635,012 | A | 6/1997 | Belluci et al. |
| 5,636,292 | A | 6/1997 | Rhoads |
| 5,638,508 | A | 6/1997 | Kanai et al. |
| 5,639,819 | A | 6/1997 | Farkas et al. |
| 5,646,997 | A | 7/1997 | Barton |
| 5,652,626 | A | 7/1997 | Kawakami et al. |
| 5,654,105 | A | 8/1997 | Obringer et al. |
| 5,658,411 | A | 8/1997 | Faykish |
| 5,659,726 | A | 8/1997 | Sandford, II et al. |
| 5,669,995 | A | 9/1997 | Hong |
| 5,671,005 | A | 9/1997 | McNay et al. |
| 5,681,356 | A | 10/1997 | Barak et al. |
| 5,683,774 | A | 11/1997 | Faykish et al. |
| 5,688,738 | A | 11/1997 | Lu |
| 5,689,706 | A | 11/1997 | Rao et al. |
| 5,691,757 | A | 11/1997 | Hayashihara et al. |
| 5,694,471 | A | 12/1997 | Chen et al. |
| 5,696,705 | A | 12/1997 | Zykan |
| 5,697,006 | A | 12/1997 | Taguchi et al. |
| 5,698,296 | A | 12/1997 | Dotson et al. |
| 5,700,037 | A | 12/1997 | Keller |
| 5,710,834 | A | 1/1998 | Rhoads |
| 5,712,731 | A | 1/1998 | Drinkwater et al. |
| 5,714,291 | A | 2/1998 | Marinello et al. |
| 5,717,018 | A | 2/1998 | Magerstedt et al. |
| 5,717,391 | A | 2/1998 | Rodriguez |
| 5,719,667 | A | 2/1998 | Miers |
| 5,719,948 | A | 2/1998 | Liang |
| 5,721,781 | A | 2/1998 | Deo et al. |
| 5,721,788 | A | 2/1998 | Powell et al. |
| 5,745,308 | A | 4/1998 | Spangenberg |
| 5,745,901 | A | 4/1998 | Entner et al. |
| 5,748,783 | A | 5/1998 | Rhoads |
| 5,760,386 | A | 6/1998 | Ward |
| 5,763,868 | A | 6/1998 | Kubota et al. |
| 5,764,263 | A | 6/1998 | Lin |
| 5,767,496 | A | 6/1998 | Swartz et al. |
| 5,768,001 | A | 6/1998 | Kelley et al. |
| 5,768,426 | A | 6/1998 | Rhoads |
| 5,768,505 | A | 6/1998 | Gilchrist et al. |
| 5,768,506 | A | 6/1998 | Randell |
| 5,769,301 | A | 6/1998 | Hebert et al. |
| 5,773,677 | A | 6/1998 | Lansink-Rotgerink et al. |
| 5,774,168 | A | 6/1998 | Blome |
| 5,776,278 | A | 7/1998 | Tuttle et al. |
| 5,783,024 | A | 7/1998 | Forkert |
| 5,786,587 | A | 7/1998 | Colgate, Jr. |
| 5,787,186 | A | 7/1998 | Schroeder |
| 5,787,269 | A | 7/1998 | Hyodo |
| 5,795,643 | A | 8/1998 | Steininger et al. |
| 5,797,134 | A | 8/1998 | McMillan et al. |
| 5,798,949 | A | 8/1998 | Kaub |
| 5,799,092 | A | 8/1998 | Kristol et al. |
| 5,801,857 | A | 9/1998 | Heckenkamp et al. |
| 5,808,758 | A | 9/1998 | Solmsdorf |
| 5,809,633 | A | 9/1998 | Mundigl et al. |
| 5,815,093 | A | 9/1998 | Kikinis |
| 5,815,292 | A | 9/1998 | Walters |
| 5,816,619 | A | 10/1998 | Schaede |
| 5,824,447 | A | 10/1998 | Tavernier et al. |
| 5,824,715 | A | 10/1998 | Hayashihara et al. |
| 5,832,481 | A | 11/1998 | Sheffield |
| 5,834,118 | A | 11/1998 | R.ang.nby et al. |
| 5,840,142 | A | 11/1998 | Stevenson et al. |
| 5,840,791 | A | 11/1998 | Magerstedt et al. |
| 5,841,886 | A | 11/1998 | Rhoads |
| 5,844,685 | A | 12/1998 | Gontin |
| 5,853,955 | A | 12/1998 | Towfiq |
| 5,855,969 | A | 1/1999 | Robertson |
| 5,856,661 | A | 1/1999 | Finkelstein et al. |
| 5,861,662 | A | 1/1999 | Candelore |
| 5,862,260 | A | 1/1999 | Rhoads |
| 5,862,500 | A | 1/1999 | Goodwin |
| 5,864,622 | A | 1/1999 | Marcus |
| 5,864,623 | A | 1/1999 | Messina et al. |
| 5,866,644 | A | 2/1999 | Mercx et al. |
| 5,867,199 | A | 2/1999 | Knox et al. |
| 5,867,586 | A | 2/1999 | Liang |
| 5,870,711 | A | 2/1999 | Huffman |
| 5,872,627 | A | 2/1999 | Miers |
| 5,873,066 | A | 2/1999 | Underwood et al. |

| | | | |
|---|---|---|---|
| 5,877,707 | A | 3/1999 | Kowalick |
| 5,879,502 | A | 3/1999 | Gustafson |
| 5,879,784 | A | 3/1999 | Breen et al. |
| 5,888,624 | A | 3/1999 | Haghiri et al. |
| 5,892,661 | A | 4/1999 | Stafford et al. |
| 5,895,074 | A | 4/1999 | Chess et al. |
| 5,897,938 | A | 4/1999 | Shinmoto et al. |
| 5,907,149 | A | 5/1999 | Marckini |
| 5,907,848 | A | 5/1999 | Zaiken et al. |
| 5,909,683 | A | 6/1999 | Miginiac et al. |
| 5,912,767 | A | 6/1999 | Lee |
| 5,912,974 | A | 6/1999 | Holloway et al. |
| 5,919,853 | A | 7/1999 | Condit et al. |
| 5,925,500 | A | 7/1999 | Yang et al. |
| 5,928,989 | A | 7/1999 | Ohnishi et al. |
| 5,930,759 | A | 7/1999 | Moore et al. |
| 5,933,816 | A | 8/1999 | Zeanah et al. |
| 5,935,694 | A | 8/1999 | Olmstead et al. |
| 5,936,986 | A | 8/1999 | Cantatore et al. |
| 5,937,189 | A | 8/1999 | Branson et al. |
| 5,944,356 | A | 8/1999 | Bergmann et al. |
| 5,944,881 | A | 8/1999 | Mehta et al. |
| 5,947,369 | A | 9/1999 | Frommer et al. |
| 5,948,035 | A | 9/1999 | Tomita |
| 5,950,169 | A | 9/1999 | Borghesi et al. |
| 5,953,710 | A | 9/1999 | Fleming |
| 5,955,021 | A | 9/1999 | Tiffany, III |
| 5,955,961 | A | 9/1999 | Wallerstein |
| 5,956,687 | A | 9/1999 | Wamsley et al. |
| 5,958,528 | A | 9/1999 | Bernecker |
| 5,962,840 | A | 10/1999 | Haghiri-Tehrani et al. |
| 5,965,242 | A | 10/1999 | Patton et al. |
| 5,973,842 | A | 10/1999 | Spangenberg |
| 5,975,583 | A | 11/1999 | Cobben et al. |
| 5,977,514 | A | 11/1999 | Feng et al. |
| 5,982,912 | A | 11/1999 | Fukui et al. |
| 5,984,366 | A | 11/1999 | Priddy |
| 5,985,078 | A | 11/1999 | Suess et al. |
| 5,987,434 | A | 11/1999 | Libman |
| 5,988,820 | A | 11/1999 | Huang et al. |
| 5,991,429 | A | 11/1999 | Coffin et al. |
| 5,991,733 | A | 11/1999 | Aleia et al. |
| 6,000,607 | A | 12/1999 | Ohki et al. |
| 6,002,383 | A | 12/1999 | Shimada |
| 6,003,581 | A | 12/1999 | Aihara |
| 6,007,660 | A | 12/1999 | Forkert |
| 6,007,929 | A | 12/1999 | Robertson et al. |
| 6,009,402 | A | 12/1999 | Whitworth |
| 6,012,641 | A | 1/2000 | Watada |
| 6,016,225 | A | 1/2000 | Anderson |
| 6,017,972 | A | 1/2000 | Harris et al. |
| 6,022,905 | A | 2/2000 | Harris et al. |
| 6,024,287 | A | 2/2000 | Takai et al. |
| 6,025,462 | A | 2/2000 | Wang et al. |
| 6,028,134 | A | 2/2000 | Zhang et al. |
| 6,036,099 | A | 3/2000 | Leighton |
| 6,036,807 | A | 3/2000 | Brongers |
| 6,037,102 | A | 3/2000 | Loerzer et al. |
| 6,037,860 | A | 3/2000 | Zander et al. |
| 6,038,333 | A | 3/2000 | Wang |
| 6,038,393 | A | 3/2000 | Iyengar et al. |
| 6,042,249 | A | 3/2000 | Spangenberg |
| 6,043,813 | A | 3/2000 | Stickney et al. |
| 6,047,888 | A | 4/2000 | Dethloff |
| 6,049,055 | A | 4/2000 | Fannash et al. |
| 6,049,463 | A | 4/2000 | O'Malley et al. |
| 6,049,665 | A | 4/2000 | Branson et al. |
| 6,051,297 | A | 4/2000 | Maier et al. |
| 6,054,170 | A | 4/2000 | Chess et al. |
| 6,062,604 | A | 5/2000 | Taylor et al. |
| 6,064,414 | A | 5/2000 | Kobayashi et al. |
| 6,064,983 | A | 5/2000 | Koehler |
| 6,066,437 | A | 5/2000 | Kosslinger |
| 6,066,594 | A | 5/2000 | Gunn et al. |
| 6,071,855 | A | 6/2000 | Patton et al. |
| 6,072,894 | A | 6/2000 | Payne |
| 6,073,854 | A | 6/2000 | Bravenec et al. |
| 6,075,223 | A | 6/2000 | Harrison |
| 6,076,026 | A | 6/2000 | Jambhekar et al. |
| 6,081,832 | A | 6/2000 | Gilchrist et al. |
| 6,082,778 | A | 7/2000 | Solmsdorf |
| 6,086,971 | A | 7/2000 | Haas et al. |
| 6,089,614 | A | 7/2000 | Howland et al. |
| 6,092,049 | A | 7/2000 | Chislenko et al. |
| 6,095,566 | A | 8/2000 | Yamamoto et al. |
| 6,100,804 | A | 8/2000 | Brady et al. |
| 6,105,007 | A | 8/2000 | Norris |
| 6,106,110 | A | 8/2000 | Gundjian et al. |
| 6,110,864 | A | 8/2000 | Lu |
| 6,111,506 | A | 8/2000 | Yap et al. |
| 6,111,517 | A | 8/2000 | Atick et al. |
| 6,115,690 | A | 9/2000 | Wong |
| 6,120,142 | A | 9/2000 | Eltgen et al. |
| 6,120,882 | A | 9/2000 | Faykish et al. |
| 6,122,403 | A | 9/2000 | Rhoads |
| 6,127,475 | A | 10/2000 | Vollenberg et al. |
| 6,134,582 | A | 10/2000 | Kennedy |
| 6,138,913 | A | 10/2000 | Cyr et al. |
| 6,141,611 | A | 10/2000 | Mackey et al. |
| 6,143,852 | A | 11/2000 | Harrison et al. |
| 6,146,032 | A | 11/2000 | Dunham |
| 6,146,741 | A | 11/2000 | Ogawa et al. |
| 6,151,403 | A | 11/2000 | Luo |
| 6,155,605 | A | 12/2000 | Bratchley et al. |
| 6,156,032 | A | 12/2000 | Lennox |
| 6,159,327 | A | 12/2000 | Forkert |
| 6,160,526 | A | 12/2000 | Hirai et al. |
| 6,160,903 | A | 12/2000 | Hamid et al. |
| 6,161,071 | A | 12/2000 | Shuman et al. |
| 6,162,160 | A | 12/2000 | Ohshima et al. |
| 6,163,770 | A | 12/2000 | Gamble et al. |
| 6,164,548 | A | 12/2000 | Curiel |
| 6,165,696 | A | 12/2000 | Fischer |
| 6,173,284 | B1 | 1/2001 | Brown |
| 6,173,901 | B1 | 1/2001 | McCannel |
| 6,174,400 | B1 | 1/2001 | Krutak, Sr. et al. |
| 6,179,338 | B1 | 1/2001 | Bergmann et al. |
| 6,183,018 | B1 | 2/2001 | Braun et al. |
| 6,184,782 | B1 | 2/2001 | Oda et al. |
| 6,185,042 | B1 | 2/2001 | Lomb et al. |
| 6,185,316 | B1 | 2/2001 | Buffam |
| 6,185,490 | B1 | 2/2001 | Ferguson |
| 6,185,540 | B1 | 2/2001 | Schreitmueller et al. |
| 6,186,404 | B1 | 2/2001 | Ehrhart et al. |
| 6,199,144 | B1 | 3/2001 | Arora et al. |
| 6,202,932 | B1 | 3/2001 | Rapeli |
| 6,206,292 | B1 | 3/2001 | Robertz et al. |
| 6,207,244 | B1 | 3/2001 | Hesch |
| 6,207,344 | B1 | 3/2001 | Ramlow et al. |
| 6,209,923 | B1 | 4/2001 | Thaxton et al. |
| 6,210,777 | B1 | 4/2001 | Vermeulen et al. |
| 6,214,916 | B1 | 4/2001 | Mercx et al. |
| 6,214,917 | B1 | 4/2001 | Linzmeier et al. |
| 6,219,639 | B1 | 4/2001 | Bakis et al. |
| 6,221,552 | B1 | 4/2001 | Street et al. |
| 6,223,125 | B1 | 4/2001 | Hall |
| 6,226,623 | B1 | 5/2001 | Schein et al. |
| 6,234,537 | B1 | 5/2001 | Gutmann et al. |
| 6,236,975 | B1 | 5/2001 | Boe et al. |
| 6,238,840 | B1 | 5/2001 | Hirayama et al. |
| 6,238,847 | B1 | 5/2001 | Axtell, III et al. |
| 6,243,480 | B1 | 6/2001 | Zhao et al. |
| 6,244,514 | B1 | 6/2001 | Otto |
| 6,246,933 | B1 | 6/2001 | Bague |
| 6,247,644 | B1 | 6/2001 | Horne et al. |
| 6,250,554 | B1 | 6/2001 | Leo et al. |
| 6,254,127 | B1 | 7/2001 | Breed et al. |
| 6,257,486 | B1 | 7/2001 | Teicher et al. |
| 6,258,896 | B1 | 7/2001 | Abuelyaman et al. |
| 6,259,506 | B1 | 7/2001 | Lawandy |
| 6,260,029 | B1 | 7/2001 | Critelli |
| 6,264,296 | B1 | 7/2001 | Klinefelter et al. |
| 6,268,804 | B1 | 7/2001 | Janky et al. |
| 6,277,232 | B1 | 8/2001 | Wang et al. |
| 6,283,188 | B1 | 9/2001 | Maynard et al. |
| 6,284,337 | B1 | 9/2001 | Lorimor et al. |
| 6,286,761 | B1 | 9/2001 | Wen |
| 6,289,108 | B1 | 9/2001 | Rhoads |

6,291,551 B1 9/2001 Kniess et al.
6,292,092 B1 9/2001 Chow et al.
6,292,575 B1 9/2001 Bortolussi et al.
6,301,164 B1 10/2001 Manning et al.
6,301,363 B1 10/2001 Mowry, Jr.
6,302,444 B1 10/2001 Cobben
6,308,187 B1 10/2001 DeStefano
6,312,858 B1 11/2001 Yacobucci et al.
6,313,436 B1 11/2001 Harrison
6,316,538 B1 11/2001 Anderson et al.
6,324,091 B1 11/2001 Gryko et al.
6,326,128 B1 12/2001 Telser et al.
6,336,096 B1 1/2002 Jernberg
6,340,725 B1 1/2002 Wang et al.
6,341,169 B1 1/2002 Cadorette, Jr. et al.
6,343,138 B1 1/2002 Rhoads
6,345,105 B1 2/2002 Nitta et al.
6,351,893 B1 3/2002 St. Pierre
6,357,664 B1 3/2002 Zercher
6,363,360 B1 3/2002 Madden
6,368,684 B1 4/2002 Onishi et al.
6,372,394 B1 4/2002 Zientek
6,380,131 B2 4/2002 Griebel et al.
6,381,561 B1 4/2002 Bomar, Jr. et al.
6,389,151 B1 5/2002 Carr et al.
6,390,375 B2 5/2002 Kayanakis
6,397,334 B1 5/2002 Chainer et al.
6,400,386 B1 6/2002 No
6,404,643 B1 6/2002 Chung
6,408,304 B1 6/2002 Kumhyr
6,413,687 B1 7/2002 Hattori et al.
6,418,154 B1 7/2002 Kneip et al.
6,421,013 B1 7/2002 Chung
6,424,029 B1 7/2002 Giesler
6,424,249 B1 7/2002 Houvener
6,427,744 B2 8/2002 Seki et al.
6,430,306 B2 8/2002 Slocum et al.
6,444,068 B1 9/2002 Koops et al.
6,444,377 B1 9/2002 Jotcham et al.
6,446,086 B1 9/2002 Bartlett et al.
6,446,865 B1 9/2002 Holt et al.
6,449,377 B1 9/2002 Rhoads
6,463,416 B1 10/2002 Messina
6,473,165 B1 10/2002 Coombs et al.
6,474,695 B1 11/2002 Schneider et al.
6,475,588 B1 11/2002 Schottland et al.
6,478,228 B1 11/2002 Ikefuji et al.
6,478,229 B1 11/2002 Epstein
6,482,495 B1 11/2002 Kohama et al.
6,485,319 B2 11/2002 Bricaud et al.
6,487,301 B1 11/2002 Zhao
6,493,650 B1 12/2002 Rodgers et al.
6,500,386 B1 12/2002 Burstein
6,503,310 B1 1/2003 Sullivan
6,525,672 B2 2/2003 Chainer et al.
6,526,161 B1 2/2003 Yan
6,527,173 B1 3/2003 Narusawa et al.
6,532,459 B1 3/2003 Berson
6,536,672 B1 3/2003 Outwater
6,546,112 B1 4/2003 Rhoads
6,555,213 B1 4/2003 Koneripalli et al.
6,570,609 B1 5/2003 Heien
6,581,839 B1 6/2003 Lasch et al.
6,583,813 B1 6/2003 Enright et al.
6,608,911 B2 8/2003 Lofgren et al.
6,614,914 B1 9/2003 Rhoads et al.
6,616,993 B2 9/2003 Usuki et al.
6,638,635 B2 10/2003 Hattori et al.
6,641,874 B2 11/2003 Kuntz et al.
6,675,074 B2 1/2004 Hathout et al.
6,681,032 B2 1/2004 Bortolussi et al.
6,685,312 B2 2/2004 Klinefelter et al.
6,702,282 B2 3/2004 Pribula et al.
6,712,397 B1 3/2004 Mayer et al.
6,715,797 B2 4/2004 Curiel
6,719,469 B2 4/2004 Yasui et al.
6,723,479 B2 4/2004 Van De Witte et al.
6,725,383 B2 4/2004 Kyle
6,729,719 B2 5/2004 Klinefelter et al.
6,751,336 B2 6/2004 Zhao
6,752,432 B1 6/2004 Richardson
6,758,616 B2 7/2004 Pribula et al.
6,764,014 B2 7/2004 Lasch et al.
6,769,061 B1 7/2004 Ahern
6,782,115 B2 8/2004 Decker et al.
6,782,116 B1 8/2004 Zhao et al.
6,783,024 B2 8/2004 Lee
6,794,115 B2 9/2004 Telser et al.
6,803,114 B1 10/2004 Vere et al.
6,817,530 B2 11/2004 Labrec et al.
6,818,699 B2 11/2004 Kajimaru et al.
6,825,265 B2 11/2004 Daga et al.
6,827,277 B2 12/2004 Bloomberg et al.
6,827,283 B2 12/2004 Kappe et al.
6,832,205 B1 12/2004 Aragones et al.
6,843,422 B2 1/2005 Jones et al.
6,853,739 B2 2/2005 Kyle
6,882,737 B2 4/2005 Lofgren et al.
6,900,767 B2 5/2005 Hattori
6,923,378 B2 8/2005 Jones et al.
6,925,468 B1 8/2005 Bobbitt et al.
6,938,029 B1 8/2005 Tien
6,942,331 B2 9/2005 Guillen et al.
6,952,741 B1 10/2005 Bartlett et al.
6,954,293 B2 10/2005 Heckenkamp et al.
6,961,708 B1 11/2005 Bierenbaum
6,963,659 B2 11/2005 Tumey et al.
6,970,844 B1 11/2005 Bierenbaum
6,978,036 B2 12/2005 Alattar et al.
7,013,284 B2 3/2006 Guyan et al.
7,016,516 B2 3/2006 Rhoads
7,024,418 B1 4/2006 Childress
7,043,052 B2 5/2006 Rhoads
7,063,264 B2 6/2006 Bi et al.
7,081,282 B2 7/2006 Kuntz et al.
7,086,666 B2 8/2006 Richardson
7,095,426 B1 8/2006 Childress
7,143,950 B2 12/2006 Jones et al.
7,183,361 B2 2/2007 Toman
7,196,813 B2 3/2007 Matsumoto
7,197,444 B2 3/2007 Bomar, Jr. et al.
7,199,456 B2 4/2007 Krappe et al.
7,202,970 B1 4/2007 Maher et al.
7,277,891 B2 10/2007 Howard et al.
7,278,580 B2 10/2007 Jones et al.
7,343,307 B1 3/2008 Childress
7,344,325 B2 3/2008 Meier et al.
7,353,196 B1 4/2008 Bobbitt et al.
7,356,541 B1 4/2008 Doughty
7,359,863 B1 4/2008 Evenshaug et al.
7,363,264 B1 4/2008 Doughty et al.
7,398,219 B1 7/2008 Wolfe
7,418,400 B1 8/2008 Lorenz
7,430,514 B1 9/2008 Childress et al.
7,430,515 B1 9/2008 Wolfe et al.
7,498,075 B2 3/2009 Bloomberg et al.
7,526,487 B1 4/2009 Bobbitt et al.
7,661,600 B2 * 2/2010 Theodossiou et al. ........ 235/492
7,798,413 B2 9/2010 Bi et al.
2001/0002035 A1 5/2001 Kayanakis
2001/0013395 A1 8/2001 Pourmand et al.
2001/0037223 A1 11/2001 Beery et al.
2001/0037455 A1 11/2001 Lawandy et al.
2002/0007289 A1 1/2002 Malin et al.
2002/0018430 A1 2/2002 Heckenkamp et al.
2002/0020832 A1 2/2002 Oka et al.
2002/0021001 A1 2/2002 Stratford et al.
2002/0027359 A1 3/2002 Cobben et al.
2002/0030587 A1 3/2002 Jackson
2002/0034319 A1 3/2002 Tumey et al.
2002/0035488 A1 3/2002 Aquila et al.
2002/0049619 A1 4/2002 Wahlbin et al.
2002/0055860 A1 5/2002 Wahlbin et al.
2002/0055861 A1 5/2002 King et al.
2002/0059083 A1 5/2002 Wahlbin et al.
2002/0059084 A1 5/2002 Wahlbin et al.
2002/0059085 A1 5/2002 Wahlbin et al.
2002/0059086 A1 5/2002 Wahlbin et al.

| | | | |
|---|---|---|---|
| 2002/0059087 | A1 | 5/2002 | Wahlbin et al. |
| 2002/0059097 | A1 | 5/2002 | Wahlbin et al. |
| 2002/0062232 | A1 | 5/2002 | Wahlbin et al. |
| 2002/0062233 | A1 | 5/2002 | Wahlbin et al. |
| 2002/0062234 | A1 | 5/2002 | Wahlbin et al. |
| 2002/0062235 | A1 | 5/2002 | Wahlbin et al. |
| 2002/0069091 | A1 | 6/2002 | Wahlbin et al. |
| 2002/0069092 | A1 | 6/2002 | Wahlbin et al. |
| 2002/0070280 | A1 | 6/2002 | Ikefuji et al. |
| 2002/0077380 | A1 | 6/2002 | Wessels et al. |
| 2002/0080992 | A1 | 6/2002 | Decker et al. |
| 2002/0080994 | A1 | 6/2002 | Lofgren et al. |
| 2002/0082873 | A1 | 6/2002 | Wahlbin et al. |
| 2002/0087363 | A1 | 7/2002 | Wahlbin et al. |
| 2002/0106494 | A1 | 8/2002 | Roth et al. |
| 2002/0116330 | A1 | 8/2002 | Hed et al. |
| 2002/0128881 | A1 | 9/2002 | Wahlbin et al. |
| 2002/0136448 | A1 | 9/2002 | Bortolussi et al. |
| 2002/0145652 | A1 | 10/2002 | Lawrence et al. |
| 2002/0146549 | A1 | 10/2002 | Kranenburg-Van Dijk et al. |
| 2002/0166635 | A1 | 11/2002 | Sasaki et al. |
| 2002/0170966 | A1 | 11/2002 | Hannigan et al. |
| 2002/0187215 | A1 | 12/2002 | Trapani et al. |
| 2002/0194476 | A1 | 12/2002 | Lewis et al. |
| 2003/0002710 | A1 | 1/2003 | Rhoads |
| 2003/0031340 | A1 | 2/2003 | Alattar et al. |
| 2003/0031348 | A1 | 2/2003 | Kuepper et al. |
| 2003/0034319 | A1 | 2/2003 | Meherin et al. |
| 2003/0038174 | A1 | 2/2003 | Jones |
| 2003/0052680 | A1 | 3/2003 | Konijn |
| 2003/0055638 | A1 | 3/2003 | Burns et al. |
| 2003/0056499 | A1 | 3/2003 | Binder et al. |
| 2003/0056500 | A1 | 3/2003 | Huynh et al. |
| 2003/0059124 | A1 | 3/2003 | Center |
| 2003/0062421 | A1 | 4/2003 | Bloomberg et al. |
| 2003/0099379 | A1 | 5/2003 | Monk et al. |
| 2003/0114972 | A1 | 6/2003 | Takafuji et al. |
| 2003/0115459 | A1 | 6/2003 | Monk |
| 2003/0117262 | A1 | 6/2003 | Anderegg et al. |
| 2003/0126121 | A1 | 7/2003 | Khan et al. |
| 2003/0128862 | A1 | 7/2003 | Decker et al. |
| 2003/0141358 | A1 | 7/2003 | Hudson et al. |
| 2003/0161507 | A1 | 8/2003 | Lawandy |
| 2003/0173406 | A1 | 9/2003 | Bi et al. |
| 2003/0178487 | A1 | 9/2003 | Rogers |
| 2003/0178495 | A1 | 9/2003 | Jones et al. |
| 2003/0183695 | A1 | 10/2003 | Labrec et al. |
| 2003/0200123 | A1 | 10/2003 | Burge et al. |
| 2003/0211296 | A1 | 11/2003 | Jones et al. |
| 2003/0226897 | A1 | 12/2003 | Jones et al. |
| 2003/0234286 | A1 | 12/2003 | Labrec et al. |
| 2003/0234292 | A1 | 12/2003 | Jones |
| 2004/0011874 | A1 | 1/2004 | Theodossiou et al. |
| 2004/0024694 | A1 | 2/2004 | Lawrence et al. |
| 2004/0030587 | A1 | 2/2004 | Danico et al. |
| 2004/0036574 | A1 | 2/2004 | Bostrom |
| 2004/0049409 | A1 | 3/2004 | Wahlbin et al. |
| 2004/0054556 | A1 | 3/2004 | Wahlbin et al. |
| 2004/0054557 | A1 | 3/2004 | Wahlbin et al. |
| 2004/0054558 | A1 | 3/2004 | Wahlbin et al. |
| 2004/0054559 | A1 | 3/2004 | Wahlbin et al. |
| 2004/0066441 | A1 | 4/2004 | Jones et al. |
| 2004/0074973 | A1 | 4/2004 | Schneck et al. |
| 2004/0076310 | A1 | 4/2004 | Hersch et al. |
| 2004/0093349 | A1 | 5/2004 | Buinevicius et al. |
| 2004/0102984 | A1 | 5/2004 | Wahlbin et al. |
| 2004/0102985 | A1 | 5/2004 | Wahlbin et al. |
| 2004/0103004 | A1 | 5/2004 | Wahlbin et al. |
| 2004/0103005 | A1 | 5/2004 | Wahlbin et al. |
| 2004/0103006 | A1 | 5/2004 | Wahlbin et al. |
| 2004/0103007 | A1 | 5/2004 | Wahlbin et al. |
| 2004/0103008 | A1 | 5/2004 | Wahlbin et al. |
| 2004/0103009 | A1 | 5/2004 | Wahlbin et al. |
| 2004/0103010 | A1 | 5/2004 | Wahlbin et al. |
| 2004/0111301 | A1 | 6/2004 | Wahlbin et al. |
| 2004/0133582 | A1 | 7/2004 | Howard et al. |
| 2004/0198858 | A1 | 10/2004 | Labrec |
| 2004/0213437 | A1 | 10/2004 | Howard et al. |
| 2004/0243567 | A1 | 12/2004 | Levy |
| 2004/0245346 | A1 | 12/2004 | Haddock |
| 2005/0001419 | A1 | 1/2005 | Levy et al. |
| 2005/0003297 | A1 | 1/2005 | Labrec |
| 2005/0010776 | A1 | 1/2005 | Kenen et al. |
| 2005/0035589 | A1 | 2/2005 | Richardson |
| 2005/0060205 | A1 | 3/2005 | Woods et al. |
| 2005/0072849 | A1 | 4/2005 | Jones |
| 2005/0095408 | A1 | 5/2005 | LaBrec et al. |
| 2005/0160294 | A1 | 7/2005 | LaBrec et al. |
| 2005/0192850 | A1 | 9/2005 | Lorenz |
| 2006/0027667 | A1 | 2/2006 | Jones et al. |
| 2006/0039581 | A1 | 2/2006 | Decker et al. |
| 2007/0158939 | A1 | 7/2007 | Jones et al. |
| 2007/0187515 | A1 | 8/2007 | Theodossiou et al. |

FOREIGN PATENT DOCUMENTS

| | | | |
|---|---|---|---|
| CA | 2469956 | A1 | 7/2003 |
| CN | 1628318 | A | 6/2005 |
| DE | 2943436 | | 5/1981 |
| DE | 3738636 | | 6/1988 |
| EP | 111075 | A2 | 6/1984 |
| EP | 0157568 | | 10/1985 |
| EP | 190997 | A2 | 8/1986 |
| EP | 0233296 | | 8/1987 |
| EP | 0279104 | | 8/1988 |
| EP | 0280773 | | 9/1988 |
| EP | 0356980 | A2 | 3/1990 |
| EP | 0356981 | A2 | 3/1990 |
| EP | 0356982 | A2 | 3/1990 |
| EP | 0362640 | A1 | 4/1990 |
| EP | 0366075 | A2 | 5/1990 |
| EP | 0366923 | A2 | 5/1990 |
| EP | 0373572 | A1 | 6/1990 |
| EP | 0374835 | A1 | 6/1990 |
| EP | 0420613 | | 4/1991 |
| EP | 0446834 | A1 | 9/1991 |
| EP | 0446846 | A2 | 9/1991 |
| EP | 0464268 | A1 | 1/1992 |
| EP | 0465018 | | 1/1992 |
| EP | 0479265 | | 4/1992 |
| EP | 0523304 | | 1/1993 |
| EP | 0539001 | A1 | 4/1993 |
| EP | 629972 | A2 | 12/1994 |
| EP | 0636495 | | 2/1995 |
| EP | 0637514 | | 2/1995 |
| EP | 642060 | A2 | 3/1995 |
| EP | 0649754 | | 4/1995 |
| EP | 0696518 | | 2/1996 |
| EP | 697433 | A1 | 2/1996 |
| EP | 0734870 | | 10/1996 |
| EP | 0736860 | | 10/1996 |
| EP | 0739748 | | 10/1996 |
| EP | 0926608 | | 6/1999 |
| EP | 0982149 | A1 | 3/2000 |
| EP | 0991014 | A2 | 4/2000 |
| EP | 1013463 | A2 | 6/2000 |
| EP | 1017016 | A2 | 7/2000 |
| EP | 1035503 | A1 | 9/2000 |
| EP | 1046515 | A1 | 10/2000 |
| EP | 1410315 | | 4/2004 |
| EP | 1909971 | A2 | 4/2008 |
| GB | 1088318 | A | 10/1967 |
| GB | 1213193 | A | 11/1970 |
| GB | 1472581 | A | 5/1977 |
| GB | 2132136 | | 7/1984 |
| GB | 2227570 | | 8/1990 |
| GB | 2240948 | A | 8/1991 |
| JP | 63146909 | A | 6/1988 |
| JP | 03126589 | | 5/1991 |
| JP | 3185585 | A | 8/1991 |
| JP | 06234289 | | 8/1994 |
| JP | 07088974 | | 4/1995 |
| JP | 09064545 | A | 3/1997 |
| JP | 10197285 | | 7/1998 |
| JP | 10214283 | | 8/1998 |
| JP | 11161711 | | 6/1999 |
| JP | 11259620 | A | 9/1999 |
| JP | 11301121 | A | 11/1999 |
| JP | 11321166 | A | 11/1999 |

| | | | |
|---|---|---|---|
| JP | 2004355659 | | 12/2004 |
| JP | 2005525254 | | 8/2005 |
| JP | 2005525949 | | 9/2005 |
| JP | 2005276238 | | 10/2005 |
| JP | 2006190331 | | 7/2006 |
| WO | WO-82/04149 | A1 | 11/1982 |
| WO | WO-89/00319 | A1 | 1/1989 |
| WO | WO-9116722 | A1 | 10/1991 |
| WO | WO-95/13597 | A2 | 5/1995 |
| WO | WO-96/03286 | A1 | 2/1996 |
| WO | WO-9701446 | A1 | 1/1997 |
| WO | WO-9718092 | A1 | 5/1997 |
| WO | WO-9732733 | A1 | 9/1997 |
| WO | WO-9819869 | A1 | 5/1998 |
| WO | WO-9830224 | | 7/1998 |
| WO | WO-9924934 | A1 | 5/1999 |
| WO | WO-0010116 | A1 | 2/2000 |
| WO | WO-0043214 | A1 | 7/2000 |
| WO | WO-0043215 | A1 | 7/2000 |
| WO | WO-0043216 | A1 | 7/2000 |
| WO | WO-0045344 | A1 | 8/2000 |
| WO | WO-0078554 | A1 | 12/2000 |
| WO | WO-0100719 | A1 | 1/2001 |
| WO | WO-01/29764 | | 4/2001 |
| WO | WO-0145559 | A1 | 6/2001 |
| WO | WO-01/56805 | | 8/2001 |
| WO | WO-01/95249 | | 12/2001 |
| WO | WO-02/26507 | A1 | 4/2002 |
| WO | WO-02/27647 | A1 | 4/2002 |
| WO | WO-0242371 | A2 | 5/2002 |
| WO | WO-0245969 | A1 | 6/2002 |
| WO | WO-02/052499 | | 7/2002 |
| WO | WO-02053499 | A1 | 7/2002 |
| WO | WO-02/078965 | | 10/2002 |
| WO | WO-02/096666 | | 12/2002 |
| WO | WO-03005291 | A1 | 1/2003 |
| WO | WO-03030079 | A2 | 4/2003 |
| WO | WO-03/056500 | | 7/2003 |
| WO | WO-03/056507 | | 7/2003 |
| WO | WO-03055684 | A2 | 7/2003 |
| WO | WO-03/095210 | | 11/2003 |
| WO | WO-03/096258 | | 11/2003 |
| WO | WO-2004034236 | | 4/2004 |
| WO | WO-2004/049242 | | 6/2004 |

OTHER PUBLICATIONS

U.S. Appl. No. 60/344,674, filed Dec. 24, 2001, LaBrec.
U.S. Appl. No. 60/344,675, filed Dec. 24, 2001, LaBrec.
U.S. Appl. No. 60/344,676, filed Dec. 24, 2001, LaBrec.
U.S. Appl. No. 60/344,677, filed Dec. 24, 2001, LaBrec.
U.S. Appl. No. 60/344,682, filed Dec. 24, 2001, Lopolito.
U.S. Appl. No. 60/344,683, filed Dec. 24, 2001, LaBrec.
U.S. Appl. No. 60/344,685, filed Dec. 24, 2001, Bi et al.
U.S. Appl. No. 60/344,686, filed Dec. 24, 2001, Jones et al.
U.S. Appl. No. 60/344,687, filed Dec. 24, 2001, Bloomberg et al.
U.S. Appl. No. 60/344,688, filed Dec. 24, 2001, Rice.
U.S. Appl. No. 60/344,698, filed Dec. 24, 2001, Bloomberg.
U.S. Appl. No. 60/344,709, filed Dec. 24, 2001, LaBrec.
U.S. Appl. No. 60/344,710, filed Dec. 24, 2001.
U.S. Appl. No. 60/344,716, filed Dec. 24, 2001, Theodossiou et al.
U.S. Appl. No. 60/344,717, filed Dec. 24, 2001, Regan et al.
U.S. Appl. No. 60/344,718, filed Dec. 24, 2001, LaBrec.
U.S. Appl. No. 60/344,719, filed Dec. 24, 2001, Bi et al.
U.S. Appl. No. 60/344,753, filed Dec. 24, 2001, Rice.
U.S. Appl. No. 60/358,321, filed Dec. 24, 2001, Munday.
U.S. Appl. No. 60/371,335, filed Feb. 19, 2002, Schneck.
U.S. Appl. No. 60/379,646, filed Apr. 9, 2002, Mailloux et al.
U.S. Appl. No. 60/379,704, filed May 10, 2002, Bi et al.
U.S. Appl. No. 60/410,544, filed May 10, 2002, Haigh.
U.S. Appl. No. 60/418,129, filed Sep. 13, 2002, Howard.
U.S. Appl. No. 60/418,762, filed Oct. 11, 2002, Rhoads.
U.S. Appl. No. 60/421,254, filed Oct. 15, 2002, Rhoads.
U.S. Appl. No. 60/429,115, filed Oct. 25, 2002, Jones.
U.S. Appl. No. 60/429,501, filed Nov. 25, 2002, Howard.
U.S. Appl. No. 60/447,502, filed Nov. 26, 2002, Haigh.
U.S. Appl. No. 60/451,840, filed Feb. 13, 2003, Levy.
U.S. Appl. No. 60/459,284, filed Mar. 3, 2003, Jones.
@Fault: Improve Claims Practices Through Greater consistency in Fault Assessment, Computer Sciences corporation, pp. 2, 2004. (g53).
"@ Fault A Commitment to Consistency," Computer Sciences Corporation, Copyright 2000, pp. 1-2.
"About Card Printing How it Works", <http://www.racoindustries.com/aboutcardp5.htm>., pp. 1-3 (Dec. 22, 2002).
"Accident Reconstruction Software Maine Computer Group," Maine Computer Group, Copyright 2001, updated Oct. 1, 2001, Accessed Oct. 29, 2001, pp. 1-2.
"ADP CSG: Integrated Medical Solutions," ADP Claims Solutions Group, Copyright 2001, Accessed Oct. 30, 2001, p. 1.
"Authentication and Security Technologies," I/O Software, Inc., Accessed Oct. 10, 2002, 4 pages.
"CSC Expands Cost Containment Solutions for Claims and Legal Expenses," Computer Sciences Corporation, Jun. 27, 2001, El Segundo, CA, pp. 1-2.
"CSC Files Suit to protect Intellectual Property", PR Newswire, New York: Jan. 12, 2000, p. 1.
"CSC Introduces Liability Assessment Tool to Improve Claims Consistency," Computer Science Corporation, Oct. 31, 2001, pp. 1-2.
"CSC: Solutions Search," Computer Sciences Corporation, Copyright 2001, Accessed Oct. 30, 2001 p. 1.
"Facelt Identification SDK," Identix, Inc., Accessed Oct. 7, 2002, 2 pages.
"Facial Scan Technology: How it works," Facial-Scan, 1999, 4 pages.
"Facial Scan Vendors and Links," Facial-Scan, 1999, 3 pages.
"Frequently Asked Questions," Facelt software, Accessed Oct. 10, 2002, 13 pages.
"ID-2000-Image Detection & Biometric Facial Recognition," 2000, 3 pages.
"Identification Solutions-Driver's Licenses and passports," Image Technologies, Copyright 2001-2002, Accessed Oct. 10, 2002, 1 page.
"IMS ICE," ADP Integrated Medical Solutions, Copyright 2001, Rockville, MD, pp. 1-6.
"Insurance Services Office Strengthens Claims Handling Team," ISO Properties, Inc., Copyright 1996, Accessed Jul. 13, 2009, Jersey City, NJ, pp. 1-3.
"Introducing Smart CCTV," Facelt, Visionics, 2000, 8 pages.
"ISO Claims Outcome Advisor," ISO Properties, Inc., Copyright 1996, Accessed Oct. 30, 2001, Jersey City, NJ, pp. 1-2.
"ISO to Acquire Claims Outcome Advisor from Computer Sciences and MYND," Dec. 21, 2000, accessed at www.swampfox.ws_ <http.//wwwswampfox.ws>.
"Lenticular—How it Works", The Vision—Sales Articles from 1998.
"Lenticular Prints", <http://www.shortcourses.com/how/lenticular/lentcular.htm>, pp. 1-6 (Dec. 16, 2002).
"Multi-Modal Biometrics Authentication System," findbiometrics.com—Multimodal Biometrics Guides and Articles, Oct. 9, 2003, 4 pages.
"Polaroid's Polaprime UV Invisible Ink System Winks at Hollywood As Godzilla's Eye in Promo Display", <http://www.polaroid.com/polinfo/press_releases/august98/080598a.html>., pp. 1-2 (Nov. 26, 2002).
"Policy Management Systems Corporation Announces Pilot Licensing of Claims Outcome Advisor™ to Blue Ridge Insurance Co.," PR Newswire. New York; Aug. 24, 1999, p. 1.
"REC-TEC Accident Reconstruction and Analysis Computer Software," George M. Bonnett, Nov. 2001, Rockledge, FL, pp. 1-5.
"REC-TEC Accident Reconstruction Software," George M. Bonnett, Sep. 2001, Rockledge FL, pp. 1-10.
"Secure ID Center: Design a Secure ID card Key technologies for a secure ID", <http://www.datacard.com/secureid/secureid_card_technologies_features.shtm>., pp. 1-5 (Dec. 12, 2002).
"Technologies Overview", <http://www.nfive.com/Articles/2.htm>, pp. 1-2 (Dec. 22, 2002).
"U.S. Unveils New $20 Note With Background Colors", U.S. Bureau of Engraving and Printing New Money Media Center, 2 pages (Jul. 28, 2003).
"We're Watching Out for You," Business Solution, Accessed Oct. 10, 2002, 3 pages.

"Welcome to Orasee Corporation", <http://www.orasee.com/one/main.php3>, pp. 1-2, (Dec. 13, 2002).
"What are 'Dye Sublimation Thermal Printers'? (Technology)", <http://www.nfive.com/Articles/2.htm>., pp. 1-2 (Dec. 22, 2002).
Amended claims from WO/056507, corresponding to those in EP 02 805 980.6, Apr. 24, 2008.
Appeal Brief filed Apr. 11, 2008 and Examiner's Answer dated May 7, 2008 from U.S. Appl. No. 10/893,149.
Aug. 16, 2007 communication from the Canadian Intellectual Property Office in Application No. 2,470,600, and a Feb. 15, 2008 Amendment in response thereto.
Baker, "Don't Throw Your Adjusters to the Lions", *Best's Review*, 95(12):66-69 (1995).
Banking Connections, Computer Sciences Corporation, Apr./May 1999, 44 pages.
Banking Connections, Computer Sciences Corporation, Apr./May 2000, 48 pages.
Banking Connections, Computer Sciences Corporation, Aug./Sep. 1999, 52 pages.
Banking Connections, Computer Sciences Corporation, Dec. 1999, 48 pages.
Banking Connections, Computer Sciences Corporation, Nov./Dec. 2000, 48 pages.
Borland, "Running Microsoft Outlook 97", *Microsoft Press*, (1997).
Canadian Patent application 2,469,938, claims as filed, with effective filing date of Dec. 20, 2002, 10 pages.
Canadian Patent application 2,469,938, Office Action dated Jul. 24, 2006, 2 pages.
Chow et al., "Forgery and Temper-Proof Identification Document," *IEEE Proc. 1993 Int. Carnahan Conf. on Security Technology*, 11-14 (1993).
CIGNA P&C Opens National Premises Liability Center, Mar. 1999, PR Newswire, p. 1.
Clariant Masterbatches Division Price Quotation #474938, Nov. 30, 2000, 2 pages.
Clariant Masterbatches, pricing, #762998, Jan. 9, 2004, 2 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Connections, Computer Sciences Corporation, Dec. 2001, 39 pages.
Connections, Computer Sciences Corporation, Jun. 2001, 44 pages.
Connections, Computer Sciences Corporation, Mar./Apr. 2001, 44 pages.
Connections, Computer Sciences Corporation, Oct. 2001, 39 pages.
Continuum Connections to the Americas, vol. 1, No. 1, The Continuum Company, Inc., Sep. 1995, 49 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, Vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections, vol. III, No. 4, The Continuum Company, Inc., Oct./Nov. 1995, 24 pages.
Cost Containment: Products and Solutions for the Property and Casualty Insurance Industry, Computer Science Corporation, Oct. 1999, 40 pages.
Datacard DCL30, "The Most Secure Card Personalization System for ID Programs," 2002, 3 pages.
Davis, "Knowledge on the Beat," Jul. 1999, Knowledge Management Magazine, www.destinationkm.com <http://www.destinationkm.com>.
Ditek@http://www.archive.org/web/20000301124742/www,ditec.com <mailto:Ditek@http://www.archive.org/web/20000301124742/www.ditec.com>, last viewed on Nov. 28, 2005.
effekte, "Plastics on the Rise", Mar. 2001, 12 pages.
EM Industries Inc., Lazer Flair LS Series Pigments, Dec. 11, 2002, 3 pages.
EP 01992398.6 first examination report, dated Jan. 7, 2005.
EP 01992398.6 notice of grant, dated Nov. 28, 2005.
EP 01992398.6 response to first examination report , dated Jul. 18, 2005.
EP02797041.7 Search Report, Mar. 19, 2007, 3 pages.
EP02797041.7, communication pursuant to Article 94(3) EPC, dated Dec. 28, 2007, of related EP counterpart application, 6 pages.
Esters, "Computers Can Help Settle Auto Claims" Apr. 28, 1997, National Underwriter. vol. 101, Iss. 17, p. 10.
Examiner's Report dated May 2, 2006, from CA Application No. 2,470,600 (corresponding to PCT/US02/41681; Published as WO03/056507).
Facelt, "Real Time Facial Surveillance and Identification System," Accessed Oct. 10, 2002, 5 pages.
Final Rejection, U.S. Appl. No. 10/836,639, Bi et al., filed Apr. 29, 2004, mailed Apr. 1, 2008.
Final Rejection, U.S. Appl. No. 10/836,639, Bi et al., filed Apr. 29, 2004, mailed Sep. 21, 2006.
Frey, Joe, "Putting a price on auto injuries: How software called Colossus evaluates your pain," Insure.com, Oct. 26, 2000, pp. 1-5.
Graff, "Laser Marking Makes Bigger Imprint in Plastics", Aug. 11, 2004, 7 pages.
Harts, "Reel to Real: Should You believe What You See?" Defense Counsel Journal, Oct. 1999, vol. 66. p. 514 from the Dialog File ABI/Inform Global.
Hill, "Cure of Thermoset Industrial Coatings", Proc. 2d Pacific Coatings forum, Nov. 1-3, 1997, 6 pages.
Hirabayashi et al., "AC Power Electroluminescence Maintenance Improvement", pp. 2449, 2452 (1983).

Holding State in Objects with Microsoft Transaction Server, Microsoft Corp., pp. 2, Jun. 1997. (f37).
Hong et al., Integrating Faces and Fingerprints for Personal Identification, IEEE Trans. On Pattern Analysis and Machine Intelligence, vol. 20, No. 12, Dec. 1998, pp. 1295-1307.
Howarth, B., "Outsourcing: Technology on tap", *Information Economy, BRW*, 21(47):1-5 (1998).
Hu et al., "Locating head and face boundaries for head-shoulder images", Patern Recognition, 32(8):1317-1333 (1999) 5230001US.
Identix, Inc., ImageWare Brings Facial Recognition to the Web, press release, Accessed Oct. 10, 2002, 2 pages.
ImageWare Takes Enterprise ID Management to the World Wide Web, new release, Accessed Oct. 10, 2002, 2 pages.
Indovina, "Multimodal Biometric Authentication Methods," A COTS Approach, 8 pages.
Insurance Connections, Computer Sciences Corporation, Feb./Mar. 1999, 52 pages.
Insurance Connections, Computer Sciences Corporation, Feb./Mar. 2000, 60 pages.
Insurance Connections, Computer Sciences Corporation, Jun./Jul. 1999, 56 pages.
Insurance Connections, Computer Sciences Corporation, Jun./Jul. 2000, 43 pages.
Insurance Connections, Computer Sciences Corporation, Sep./Oct. 2000, 43 pages.
Insurance Connections, Computer Sciences Corporations, Oct./Nov. 1999, 56 pages.
International search report application No. PCT/US01/30822, mailed Jan. 22, 2002, 5 pages.
Jain et al., A Multimodal Biometric System Using fingerprint, Face and Speech, Proc. 2d Int. Conf. on A VBPA, Mar. 1999, pp. 182-187.
Jarvis, "Are Privacy Rights of Citizens Being Eroded Wholesale?" Accessed Oct. 4, 2002, 5 pages.
Juhl, Randy P., "The OTC Revolution"; Drugtopics.com; Mar. 3, 1997, pp. 1-9.
Kahn, "The Premise Behind Premises Liability" Feb. 1994, Security Management, vol. 38, Iss.2 pp. 61-63.
Kanopoulos et al., "Design of an image edge detection filter using the sobel operator", *IEEE J. Solid-State Circuits*, 23(2):358-367 (1988).
Kawaguchi et al., "Principle and Applications of BPCS-Streganography," *Proc. SPIE*, 3258:464-473 (1998).
Komatsu et al., "Authentication System Using Concealed Image in Telematics," *Memoirs of the School of Science & Engineering, Waseda Univ.*, No. 52, 45-60 (1988).
Komatsu, et al., "A Proposal on Digital Watermarking in Document Image Communication and Its Application to Realizing a Signature," *Electronics and Communications in Japan*, 73(5):22-23 (1990).
Laser Technology, Inc. "Crash/Crime Scene Mapping" @ http://www.lasertech.com/accidentcsinv.html. Copyright 1999.
Laser Technology, inc. "QuickMap 3D" http:web.archive.org/web/200003011511/222.lasertech.com/laserproducts/qm3d.html, last viewed on Nov. 28, 2005.
Lhotka et al., "Lenticular Inkjet Printmaking", http://www.dvpratt.com/evesmind/lentOver.htm, pp. 1-2 (Dec. 16, 2002).
Li et al., "Facial Expression Transformation Based on Sketch Image and Multiscale Edges", *Electronics Comm*. Japan, 84(9):67-75 (2001).
Lindberg, Gunnar, "Calculating Transport Accident Costs: Final report of the Expert Advisors to the high Level group on Infrastructure charging (Working Group 3)." Borlaenge, Sweden. Apr. 27, 1999, 53 pages.
Liu, "A Practical Guide to Biometric Security Technology," 2001 IEEE, Jan./Feb. 2001 IT PRO, pp. 27-32.
Madan, "The Face is Familier," 2001, 2 pages.
Malloy, "Big Time' Match Frame May Be Small, but it has No Problems Working with the Big Boys", San Antonio Business Journal, vol. 5 No. 11, s1, p. aa, Mar. 15, 1999. Dialog ID No. 0205483 from Dialog File 635 (Business Dateline. RTM.).
McHenry, Brian G., "The Algorithms of Crash," Southeast Coast Collision Conference, Aug. 2001, pp. 1-34.
Mead, "Measuring the value added by technical documentation: A review of research and practice", *Technical Comunication*, 45(3):353-380 (1998).
Meckbach, "U.S. Universities pick up Ditek's CAD application" Feb. 26, 1999. Computing Canada. vol. 25, Iss. 8 p. 14.
Merlin, Jr., William F., "Collision Course With the Colossus Program: How to Deal With It," The Merlin Law Group, May 2000, Tampa, FL, pp. 1-17.
Merlin, Jr., William F., "Colossus: What We Know Today," The Merlin Law Group, Aug. 2000, Tampa, FL, pp. 1-8.
Merlin, Jr., William F., "Overcoming Allstate's TradeSecrets and Work-Product Objections," The Merlin Law Group, Mar. 2000, Tampa, FL, pp. 1-31.
Mhatre, "Efficient Search and Retrieval in Biometric Databases," not dated 4 pages.
Microsoft Component Services: Server Operating System A Technology Overview, Microsoft Corp., p. 1-7, Aug. 15, 1998. (f38).
Moran, R., "3-D Imagery", <http://www.flexography.org/flexo/article.cfm?ID=45>, pp. 1-3 (Dec. 16, 2002).
Narin, Geoff, IT and Crime Resolution, It's elementary, Holmes helps UK police solve crimes, Financial Times, Dec. 3, 1997, Financial Times (London, UK), p. 17.
Nicolle, "Elementary, dear Holmes," Jan. 22, 1997, The Times (London, UK, pg. Interfa).
Non-Final Rejection, U.S. Appl. No. 10/836,639, Bi et al., filed Apr. 29, 2004, mailed Apr. 14, 2009.
Non-Final Rejection, U.S. Appl. No. 10/836,639, Bi et al., filed Apr. 29, 2004, mailed Aug. 8, 2007.
Non-Final Rejection, U.S. Appl. No. 10/836,639, Bi et al., filed Apr. 29, 2004, mailed Mar. 10, 2006.
Non-Final Rejection, U.S. Appl. No. 10/836,639, Bi et al., filed Apr. 29, 2004, mailed Aug. 10, 2005.
Oct. 18, 2007 Communication from the European Patent Office in Application No. EP 02 805 980.6.
Office Action dated Feb. 1, 2007, from U.S. Appl. No. 10/942,321, 10 pages.
Office Action dated May 13, 2008, from U.S. Appl. No. 10/677,092, 5 pages.
Office Action dated Jun. 20, 2007, from U.S. Appl. No. 10/677,092, 6 pages.
Palla, "Classification and Indexing in Large Biometric Databases," 2 Pages.
Paulson, B.A., "High Definition Printing Process for Identification Card Production", ICMA, www.icma.com/info/hdprinting91099.htm <http://www.icma.com/info/hdprinting91099.htm>, (Apr. 9, 2002).
PCT—International Search Report for International Application No. PCT/USO2/41644, mailed on May 30, 2003.
PCT—International Search Report for International Application No. PCT/USO2/41680, mailed on Jun. 5, 2003.
PCT—International Search Report for International Application No. PCT/USO2/41681, mailed on Jun. 5, 2003.
PCT—International Search Report for International Application No. PCT/USO2/40843, mailed on May 15, 2003.
PCT—International Search Report for International Application No. PCT/US03/15095, mailed on Mar. 25, 2004.
PCT—International Search Report for the International Application No. PCT/US02/41320, mailed on Jul. 28, 2003.
PCT—Notification of Transmittal of the International Search Report or the Declaration, for International Application No. PCT/USO2/40843, mailed on May 15, 2003.
PCT—Notification of Transmittal of the International Search Report or the Declaration, for International Application No. PCT/USO2/41680, mailed on Jun. 5, 2003.
PCT—Notification of Transmittal of the International Search Report or the Declaration, for the International Application No. PCT/US02/41320, mailed on Jul. 28, 2003.
Perry et al., "Digital Watermarks as a Security Feature for Identity Documents", *Proc. Of SPIE*, 3973:80-87 (2000).
Plastics Technology, "Laser Marking Has a Bright Future in Plastics", <http://www.plasticstechnology.com/articles/200108fa1.html>, Aug. 2001, 5 pages.
Printed PolyOne company web page for FAST MARK colorants, 2 printed pages, printed on Dec. 15, 2003 and accessed from: <http://www.polyone.com/bizunit/bizunit_info.asp?ID1={4D07B4ED-C098-43E4-B802-21413A1FA74C}&ID2={8C29FDCA-7C9E-

433E-897A-DB6354A01CAA}&ID3={00000000-0000-0000-0000-000000000000}&ID4={FE3434DA-7FA0-4FFF-99AF-CDD99EC16AE1}&bizUnit=NA-P-CMline=&sub=none>.
Property and Casualty Solutions: CSC's Property & Casualty Claims Solutions, Computer Sciences Corporation, pp. 2, 2003. (g51).
Ross, "Information Fusion in Biometrics," Proc. Of 3rd Intl Conf. on Audio-and Video-Based Person Authentication, pp. 354-359, Jun. 6-8, 2001.
Ross, "Multimodal Biometrics: An Overview," 12 European Signal Processing Conf., pp. 1221-1224, Sep. 2004.
Scopus and Entrust: Call Center Sales Helper is Unveiled, Nov. 10, 1997; vol. 162, Issue 217, p. 19.
Scopus Introduces World's Most Complete Call Center Solution for Financial Services; PR Newswire dated Nov. 5, 1997.
Seybold Report on desktop Publishing, "Holographic Signatures for Digital Images", Aug. 1995, 1 page.
Spice, "Police use lasers, computers to map scenes Town of Pewaukee's new system boost accuracy of reconstructions, users say" Sep. 29, 1998. Milwaukee Journal Sentinel. p. 2.
Straight Through Processing: Migration Assessment for Series II Clients Computer Sciences Corporation, pp. 6, 2003. (g50).
Supplemental European Search Report dated Jul. 20, 2006, from EP Application No. 02805980 (Corresponding to PCT/US02/41681; Published as WO03/056507).
Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979, pp. 101-109.
Trademark for @Fault, accessed from uspto.gov on Feb. 8, 2006.
Traynor, "The Effects of Varying Safety Conditions on the External Costs of Driving," Winter, 1994 Eastern Economic Journal, vol. 20 No. 1 pp. 45-60.
U.S. Patent and Trademark Office, "Communication" for U.S. Appl. No. 09/969,027 mailed Jan. 11, 2008.
U.S. Patent and Trademark Office, "Communication" for U.S. Appl. No. 09/969,017 mailed May 9, 2007.
U.S. Patent and Trademark Office, "Communication" for U.S. Appl. No. 09/969,016 mailed May 3 2007.
U.S. Patent and Trademark Office, "Communication" for U.S. Appl. No. 09/969,534 mailed May 30, 2007.
U.S. Patent and Trademark Office, "Communication" for U.S. Appl. No. 09/969,027 mailed Jun. 20, 2007.
U.S. Patent and Trademark Office, "Communication" for U.S. Appl. No. 10/306,866 mailed Jun. 21, 2007.
U.S. Patent and Trademark Office, "Communication" for U.S. Appl. No. 10/306,858 mailed Jun. 29, 2007.
U.S. Patent and Trademark Office, "Communication" for U.S. Appl. No. 09/969,021 mailed Mar. 8, 2007.
U.S. Patent and Trademark Office, "Communication" for U.S. Appl. No. 09/969,020 mailed Jul. 5, 2007.
U.S. Patent and Trademark Office, "Communication" for U.S. Appl. No. 09/969,018 mailed Jun. 21, 2007.
U.S. Patent and Trademark Office, "Communication" for U.S. Appl. No. 09/969,024 mailed May 23, 2007.
U.S. Patent and Trademark Office, "Communication" for U.S. Appl. No. 10/306,623 mailed Mar. 7, 2007.
U.S. Patent and Trademark Office, "Communication" for U.S. Appl. No. 10/306,873 mailed Sep. 20, 2007.
U.S. Patent and Trademark Office, "Communication" for U.S. Appl. No. 10/306,804 mailed Oct. 3, 2007.
U.S. Patent and Trademark Office, "Communication" for U.S. Appl. No. 10/306,909 mailed Oct. 5, 2007.
U.S. Patent and Trademark Office, "Communication" for U.S. Appl. No. 10/306,803 mailed Oct. 5, 2007.
U.S. Patent and Trademark Office, "Communication" for U.S. Appl. No. 10/306,908 mailed Oct. 4, 2007.
U.S. Patent and Trademark Office, "Communication" for U.S. Appl. No. 10/306,864 mailed Oct. 4, 2007.
U.S. Patent and Trademark Office, "Communication" for U.S. Appl. No. 09/969,545 mailed Oct. 18, 2006.
U.S. Patent and Trademark Office, "Communication" for U.S. Appl. No. 10/306,628 mailed Oct. 10, 2007.
U.S. Patent and Trademark Office, "Communication" for U.S. Appl. No. 09/969,024 mailed Jan. 31, 2006.
U.S. Patent and Trademark Office, "Communication" for U.S. Appl. No. 09/969,024 mailed Jun. 1, 2006.
U.S. Patent and Trademark Office, "Communication" for U.S. Appl. No. 09/969,022 mailed Apr. 6, 2006.
U.S. Patent and Trademark Office, "Communication" for U.S. Appl. No. 09/969,015 mailed Jun. 1, 2006.
U.S. Patent and Trademark Office, "Communication" for U.S. Appl. No. 09/969,019 mailed Jun. 1, 2006.
U.S. Patent and Trademark Office, "Communication" for U.S. Appl. No. 09/969,546 mailed Mar. 21, 2006.
U.S. Patent and Trademark Office, "Communication" for U.S. Appl. No. 09/969,016 mailed Mar. 21, 2006.
U.S. Patent and Trademark Office, "Communication" for U.S. Appl. No. 09/969,018 mailed Jan. 26, 2006.
U.S. Patent and Trademark Office, "Communication" for U.S. Appl. No. 09/969,018 mailed Jun. 2, 2006.
U.S. Patent and Trademark Office, "Communication" for U.S. Appl. No. 09/969,545 mailed Mar. 23, 2006.
U.S. Patent and Trademark Office, "Communication" for U.S. Appl. No. 09/969,536 mailed Mar. 24, 2006.
U.S. Patent and Trademark Office, "Communication" for U.S. Appl. No. 09/969,516 mailed Aug. 10, 2006.
U.S. Patent and Trademark Office, "Communication" for U.S. Appl. No. 09/970,161 mailed Mar. 23, 2006.
U.S. Patent and Trademark Office, "Communication" for U.S. Appl. No. 09/969,021 mailed Feb. 27, 2006.
U.S. Patent and Trademark Office, "Communication" for U.S. Appl. No. 09/969,146 mailed Feb. 28, 2006.
U.S. Patent and Trademark Office, "Communication" for U.S. Appl. No. 09/969,027 mailed Mar. 3, 2006.
U.S. Patent and Trademark Office, "Communication" for U.S. Appl. No. 09/969,018 mailed Dec. 4, 2006.
U.S. Patent and Trademark Office, "Communication" for U.S. Appl. No. 10/306,858 mailed Dec. 13, 2007.
U.S. Patent and Trademark Office, "Communication" for U.S. Appl. No. 10/238,981 mailed Jan. 25, 2008.
U.S. Patent and Trademark Office, "Communication" for U.S. Appl. No. 10/238,029 mailed Dec. 13, 2007.
U.S. Patent and Trademark Office, "Communication" for U.S. Appl. No. 09/969,021 mailed Jan. 8, 2008.
U.S. Patent and Trademark Office, "Communication" for U.S. Appl. No. 10/238,981 mailed Apr. 16, 2008.
U.S. Patent and Trademark Office, "Communication" for U.S. Appl. No. 10/238,019 mailed Jan. 11, 2008.
U.S. Patent and Trademark Office, "Communication" for U.S. Appl. No. 10/306,623 mailed Jan. 25, 2008.
U.S. Patent and Trademark Office, "Communication" for U.S. Appl. No. 09/969,017 mailed Apr. 16, 2008.
U.S. Patent and Trademark Office, "Communication" for U.S. Appl. No. 09/969,016 Mar. 17, 2008.
U.S. Patent and Trademark Office, "Communication" for U.S. Appl. No. 09/969,534 mailed Apr. 15, 2008.
U.S. Patent and Trademark Office, "Communication" for U.S. Appl. No. 09/969,019 mailed Feb. 27, 2008.
U.S. Patent and Trademark Office, "Communication" for U.S. Appl. No. 09/969,019 mailed Apr. 28, 2008.
U.S. Patent and Trademark Office, "Communication" for U.S. Appl. No. 09/969,146 mailed Sep. 22, 2006.
U.S. Patent and Trademark Office, "Communication" for U.S. Appl. No. 09/969,146 mailed Oct. 5, 2007.
U.S. Patent and Trademark Office, "Communication" for U.S. Appl. No. 10/306,628 mailed Mar. 27, 2008.
U.S. Patent and Trademark Office, "Communication" for U.S. Appl. No. 10/238,029 mailed May 12, 2008.
U.S. Patent and Trademark Office, "Communication" for U.S. Appl. No. 10/306,864 mailed Mar. 27, 2008.
U.S. Patent and Trademark Office, "Communication" for U.S. Appl. No. 10/306,908 mailed Mar. 21, 2008.
U.S. Patent and Trademark Office, "Communication" for U.S. Appl. No. 10/306,866 mailed May 5, 2008.

U.S. Patent and Tradmark Office, "Communication" for U.S. Appl. No. 09/969,534 mailed Feb. 17, 2006.
U.S. Patent and Tradmark Office, "Communication" for U.S. Appl. No. 09/969,017 mailed Mar. 1, 2006.
U.S. Patent and Tradmark Office, "Communication" for U.S. Appl. No. 09/969,017 mailed Oct. 11, 2006.
U.S. Patent and Tradmark Office, "Communication" for U.S. Appl. No. 09/969,017 mailed May 9, 2007.
U.S. Patent and Tradmark Office, "Communication" for U.S. Appl. No. 09/969,534 mailed May 30, 2007.
U.S. Patent and Tradmark Office, "Communication" for U.S. Appl. No. 09/969,516 mailed Nov. 14, 2007.
U.S. Appl. No. 10/836,639, Bi et al., filed Apr. 29, 2004.
U.S. Appl. No. 09/741,779, filed Dec. 21, 2000.
U.S. Appl. No. 60/456,677, filed Mar. 21, 2003.
U.S. Appl. No. 60/459,284, filed Mar. 31, 2003.
U.S. Appl. No. 60/463,659, filed Apr. 16, 2003.
U.S. Appl. No. 60/463,660, filed Mar. 31, 2003.
U.S. Appl. No. 60/488,536, filed Jul. 17, 2003.
U.S. Appl. No. 60/494,660, filed Aug. 8, 2003.
Unisys Selects Identix for Department of Defense Research on Three Dimensional Facial Recognition, Press Release, Jul. 29, 2003, 3 pages.
Utzaeider, James, "Microsoft Transaction Server and Internet Information Server: Technology for the Web," Microsft Corp., p. 15, Feb. 6, 1998. (f44).
W. Rankl and W. Effing, "Smart Card Hand Book" 1997, John Wiley & Sons, pp. 35-40.
Warland et al., High-Performance Communication Networks, *Economics*, Chapter 8 through 8.2.1:361-369 (1996).
Watt & Policarpo, "The Computer Image", Addison Wesley, pp. 247-249 (1998).
Wayne Electronics, Inc., What is FaceIt? Accessed Oct. 10, 2002, 5 pages.
Willems, "Biometrics: Detecting the 'Goats'," Speech Technology Magazine, Oct. 9, 2003, 6 pages.
WO02/052499 search report, dated Aug. 30, 2002.
WO02/052499 Written Opinion, dated Mar. 18, 2004.
PCT—Notification of Transmittal of the International Search Report or the Declaration and International Search Report for International Application No. PCT/US02/41681, mailed on Jun. 5, 2003.
PCT—Notification of Transmittal of the International Search Report or the Declaration and International Search Report for International Application No. PCT/US02/41644, mailed on May 30, 2003.

* cited by examiner

PRIOR ART (A)

LASER ETCHED SECURITY FEATURES FOR IDENTIFICATION DOCUMENTS AND METHODS OF MAKING SAME

RELATED APPLICATION DATA

This application is a continuation of Ser. No. 11/737,533, filed Apr. 19, 2007 now U.S. Pat. No. 7,661,600 which is a continuation of application Ser. No. 10/330,033, filed Dec. 24, 2002, now U.S. Pat. No. 7,207,494 which claims priority to provisional patent application Ser. No. 60/344,716, filed Dec. 24, 2001.

The subject matter of this application is also related to the following U.S. provisional patent applications, which were filed Dec. 24, 2001:

- Sensitizing Materials For Laser Engraving (Application No. 60/344,677);
- Full Color Laser Engraved System For Identification Card Imaging (Application No. 60/344,674);
- Reducing Cracking In Identification Documents (Application No. 60/344,710);
- An Inkjet Receiver on Teslin Sheet (Application No. 60/344,685);
- Laser Engraving Coating System (Application No. 60/344,675);
- Forming Variable Information In Identification Documents by Laser Ablation (Application No. 60/344,676);
- Manufacture of Contact Smart Cards (Application No. 60/344,717);
- Manufacture of Contact-Less Smart Cards (Application No. 60/344,719);
- Manufacture of An All-Pet Identification Document (Application No. 60/344,673);
- Tamper Evident Coating To Combat Heat Intrusion (Application No. 60/344,709);
- Pressure Sensitive UV Curable Adhesive Composition (Application No. 60/344,753);
- Heat Activated UV Curable Adhesive Composition (Application No. 60/344,688);
- Security Ink With Cohesive Failure (Application No. 60/344,698);
- Variable Based Identification Documents With Security Features (application Ser. No. 60/344,686);
- Multiple Image Feature For Identification Document (Application No. 60/344,718);
- Biometric Identification System (Application No. 60/344,682);
- Identification Document Using Polasecure In Differing Colors (application Ser. No. 60/344,687); and
- Secure ID Card With Multiple Images and Method of Making (application Ser. No. 60/344,683).

The subject matter of this application is also related to the following applications:

- Identification Document and Related Methods (Application No. 60/421,254, filed Oct. 25, 2002);
- Identification Document and Related Methods (Application No. 60/418,762, filed Oct. 15, 2002);
- Image Processing Techniques for Printing Identification Cards and Documents (Application No. 60/371,335, filed Apr. 9, 2002);
- Shadow Reduction System and Related Techniques for Digital Image Capture (Application No. 60/410,544, filed Sep. 13, 2002);
- Systems and Methods for Recognition of Individuals Using Combination of Biometric Techniques (Application No. 60/418,129, filed Oct. 11, 2002);

- Methods of Providing Optical Variable Device for Identification Documents (Application No. 60/429,115, filed Nov. 25, 2002);
- Systems and Methods for Managing and Detecting Fraud in Image Databases Used with Identification Documents (Application No. 60/429,501, filed Nov. 26, 2002);
- Identification Card Printed with Jet Inks and Systems and Methods of Making Same (application Ser. No. 10/289, 962, filed Nov. 6, 2002, published as US20030211296);

The present technology is also related to U.S. patent application Ser. Nos. 09/747,735, filed Dec. 22, 2000 (now U.S. Pat. No. 6,923,378); Ser. No. 09/602,313, filed Jun. 23, 2000 (now U.S. Pat. No. 6,752,432); Ser. 10/094,593, filed Mar. 6, 2002, Provisional Patent Application No. 60/358,321, filed Feb. 19, 2002, as well as U.S. Pat. No. 6,066,594.

Each of the above-referenced documents is herein incorporated by reference.

TECHNICAL FIELD

The present technology is generally related to identification documents, and in one particular arrangement concerns laser engraving security features onto such identification documents.

BACKGROUND

Exemplary prior work illustrating laser engraving/etching of identification documents is shown in UK patent publications GB 2,240,948and GB 2,132,136, and in PCT publication WO00/43216. The reader is referred to such documents for background.

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an automated teller machine (ATM), debit an account, or make a payment, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

FIGS. 1 and 2 illustrate a front view and cross-sectional view (taken along the A-A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint). Although not illustrated in FIG. 1, the ID document 10 can include a magnetic stripe (which, for example, can be on the rear side (not shown) of the ID document 10), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, an ID document 10 comprises a pre-printed core 20 (also referred to as a substrate). In many applications, the core can be a light-colored, opaque material, such as, for example, white polyvinyl chloride (PVC) material that is, for example, about 25 mil thick. The core 20 is laminated with a transparent material, such as clear PVC material 22, which, by way of example, can be about 1-5 mil thick. The composite of the core 20 and clear PVC material 22 form a so-called "card blank" 25 that can be up to about 30 mils thick. Information 26*a-c* is printed on the card blank 25 using a method such as Dye Diffusion Thermal Transfer ("D2T2") printing (described further below and also in commonly assigned U.S. Pat. No. 6,066,594, which is incorporated herein by reference.) The information 26*a-c* can, for example, comprise an indicium or indicia, such as the invariant or nonvarying information common to a large number of identification documents, for example the name and logo of the organization issuing the documents. The information 26*a-c* may be formed by any known process capable of forming the indicium on the specific core material used.

To protect the information 26*a-c* that is printed, an additional layer of overlaminate 24 can be coupled to the card blank 25 and printing 26*a-c* using, for example, 1 mil of adhesive (not shown). The overlaminate 24 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

The above-described printing techniques are not the only methods for printing information on data carriers such as ID documents. Laser beams, for example can be used for marking, writing, bar coding, etching, and engraving many different types of materials, including plastics. Lasers have been used, for example, to mark plastic materials to create indicia such as bar codes, date codes, part numbers, batch codes, and company logos. Lasers also have been used to engrave or etch very fine patterns into articles that are extremely difficult to replicates.

It will be appreciated that laser engraving or marking generally involves a process of inscribing or engraving a document surface with identification marks, characters, text, tactile marks—including text, patterns, designs (such as decorative or security features), photographs, etc. Some types of thermoplastics, such as polyvinylchloride (PVC), acrylonitrile butadiene styrene (ABS), and polyethylene terephthalate (PET), are capable of absorbing laser energy in their native states. Some materials which are transparent to laser energy in their native state, such as polyethylene, may require the addition of one or more additives to be responsive to laser energy.

For additional background, various laser marking and/or engraving techniques are disclosed, e.g., in U.S. Pat. Nos. 6,022,905, 5,298,922, 5,294,774, 5,215,864 and 4,732,410. In addition, U.S. Pat. Nos. 4,816,372, 4,894,110, 5,005,872, 5,977,514, and 6,179,338 describe various implementations for using a laser to print information. All of these patents are incorporated herein in their entirety.

Features and advantages of the present technology are disclosed in the following Detailed Description, which proceeds with reference to the accompanying drawings.

Figure 1:
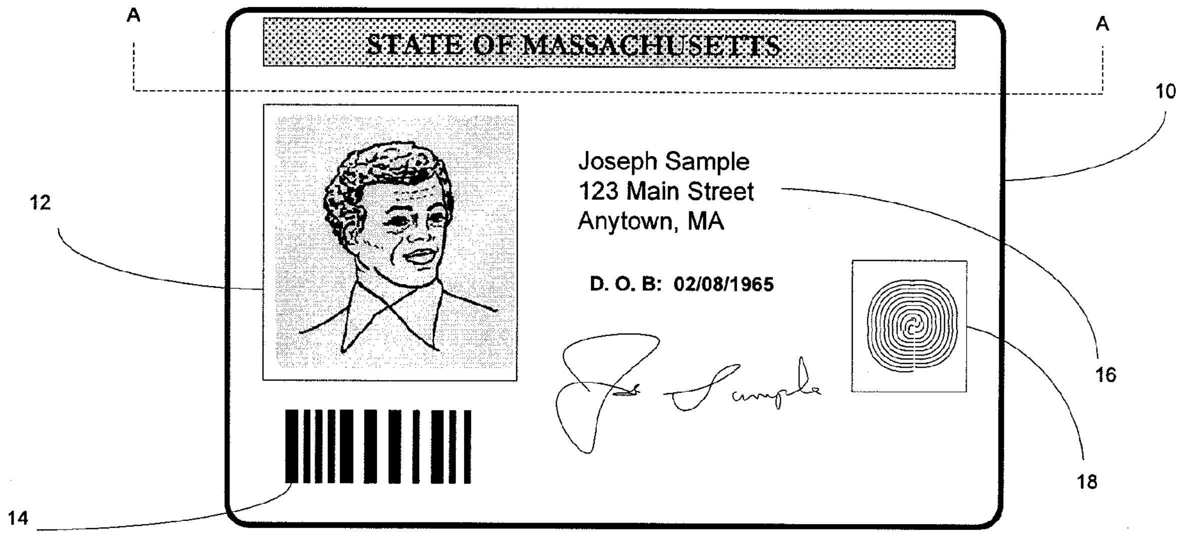
FIGURE 1 PRIOR ART
FIG. 1 is an illustrative example of a prior art identification document.
Figure 2:
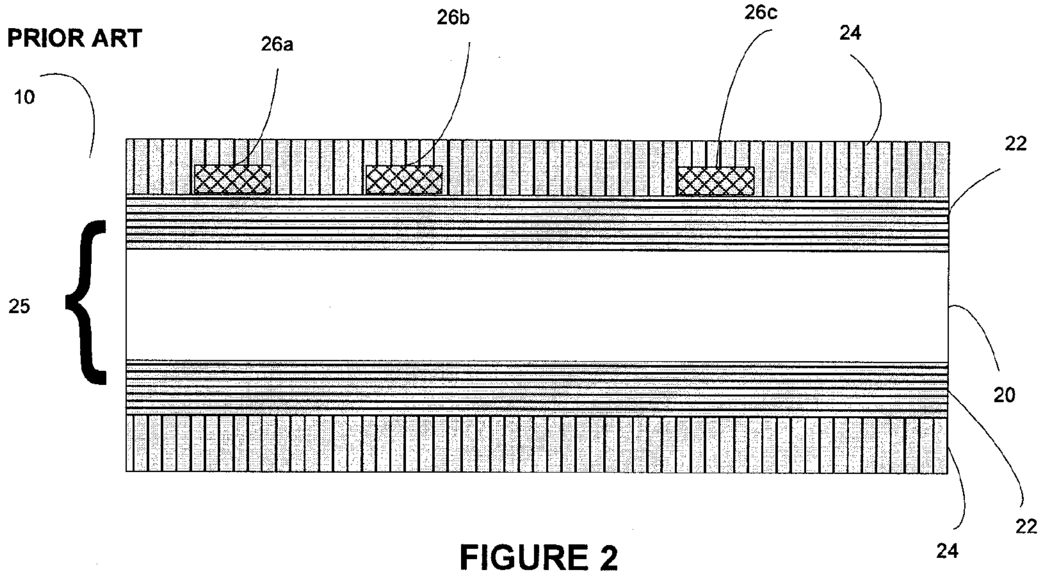
FIG. 2 is an illustrative cross section of the prior art identification document of FIG. 1, taken along the A-A line.

The drawings are not necessarily to scale, emphasis instead generally being placed upon illustrating the principles of the technology. In addition, in the figures, like numbers refer to like elements. Further, throughout this application, laser engraved indicia, information, identification documents, data, etc., may be shown as having a particular cross sectional shape (e.g., rectangular) but that is provided by way of example and illustration only and is not limiting, nor is the shape intended necessarily to represent the actual resultant cross sectional shape that occurs during laser engraving or manufacturing of identification documents.

DETAILED DESCRIPTION

A. Introduction

In the foregoing discussion, the use of the word "ID document" is broadly defined and intended to include at least all types of ID documents, including (but are not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards and badges, certificates, identification cards or documents, voter registration and/or identification cards, police ID cards, border crossing cards, security clearance badges and cards, gun permits, badges, gift certificates or cards, membership cards or badges, tags, CD's, consumer products, knobs, keyboards, electronic components, etc., or any other suitable items or articles that may record information, images, and/or other data, which may be associated with a function and/or an object or other entity to be identified.

Note that, for the purposes of this disclosure, the terms "document," "card," "badge" and "documentation" are used interchangeably.

In addition, in the foregoing discussion, "identification" includes (but is not limited to) information, decoration, and any other purpose for which an indicia can be placed upon an article in the article's raw, partially prepared, or final state. Also, instead of ID documents, the present techniques can be employed with product tags, product packaging, business cards, bags, charts, maps, labels, etc., etc., particularly those items including engraving of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are printed at the time of card personalization. Personalized data can, for example, be "personal to" or "specific to" a specific cardholder or group of cardholders. Personalized data can include data that is unique to a specific cardholder (such as biometric information, image information), but is not limited to unique data. Personalized data can include some data, such as birthdate, height, weight, eye color, address, etc., that are personal to a specific cardholder but not necessarily unique to that cardholder (i.e., other cardholders might share the same personal data, such as birthdate). Depending on the application, however, personalized data can also include some types of data that are not different from card to card, but that are still provided at the time of card personalization. For example, a state seal that is laser engraved onto a portion of an overlaminate in an identification document, where the laser engraving occurs during the personalization of the card, could in some instances be considered to be "personalized" information.

The terms "laser engraving" and "laser etching" are used interchangeably herein.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

"Laminate" and "overlaminate" include (but are not limited to) film and sheet products. Laminates usable with at least some embodiments include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils. Lamination of any laminate layer(s) to any other layer of material (e.g., a core layer) can be accomplished using any conventional lamination process, and such processes are well-known to those skilled in the production of articles such as identification documents. Of course, the types and structures of the laminates described herein are provided only by way of example, those skilled in the art will appreciated that many different types of laminates are usable.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. Patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures (e.g., TESLIN-core, multi-layered ID documents) and fused polycarbonate structures. It should be appreciated, however, that the present technology is not so limited. Indeed, as those skilled in the art will appreciate, the techniques detailed herein can be applied to many other structures formed in many different ways to improve their laser engraving characteristics. Generally, the technology has applicability for virtually any product which is to be laser etched or laser engraved, especially articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Delaware), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

In addition, at least one embodiment relates to virtually any article formed from, laminated with, or at least partially covered by a material that not sufficiently responsive to laser radiation to form a desired indicium (e.g., a grayscale image) thereon, but which is rendered more responsive to laser radiation, at least to a sufficient degree to enable its surface to be marked as desired with a laser beam, by adding the laser enhancing additive to the material itself or to another material (e.g., a coating or laminate) that is substantially adjacent to the material.

B. Laser Etching and Engraving

It is often desirable to mark a portion of a structure, such as a multi-layered structure (including after lamination), such as an ID document, with text, information, graphics, logos, security indicia, security features, marks, images and/or photographs. One goal of producing a secure ID document or card is to be able to manufacture it with materials and/or processes that are not readily available and to endow the card with unique, personalized features that are not easily reproduced by conventional means.

In at least some embodiments, laser etching helps to provide unique personalized features, in that the finished ID document can be uniquely altered and personalized at the same time. In at least one embodiment, the effect produced by laser etching can be identified easily by a person checking the card, often without special equipment, because the laser etching produces a visual effect and/or a tactile effect. In at least one embodiment, laser etching can produce a security feature having an optically variable (OV) quality. Laser etching can be produced so that it cannot be easily seen when viewed straight on; a property that has the added benefit of not allowing it to be photocopied. The laser etched feature, however, becomes very apparent in reflected light because the laser etching creates reflecting surfaces that are not parallel to the surface of the document (e.g., the core surface and/or laminate surface). In addition, the laser removes material from the surface of the card and may (optionally) create a pattern that can be felt by touch. This tactile property may be used to further verify the authenticity of the card.

Figure 3:
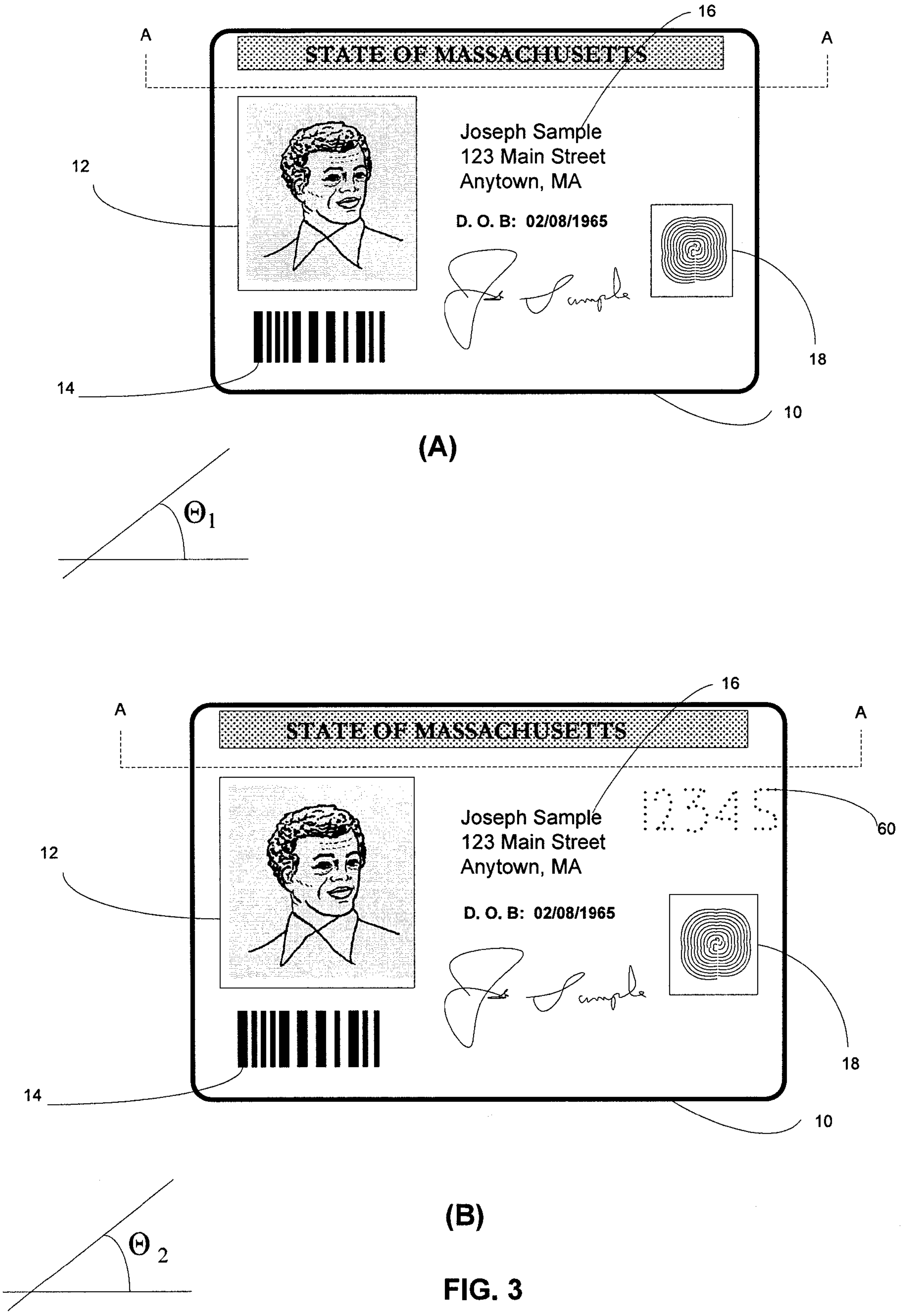
FIGS. 3A and 3B are views of an identification document in accordance with one embodiment, viewed at first and second angles, respectively.

For example, FIGS. 3A and 3B are views of an identification document 10 in accordance with one embodiment, viewed at first and second angles, respectively. FIG. 3A is a view of the identification document 10 where a viewer is looking directly at the identification document 10, and FIG. 3B is view of the identification document 10 as the document is rotated to an angle of about 45 to 85 degrees as compared to the view of the image in FIG. 3A. Of course, the angle depends on the angle of the light, as well, as will be understood by those skilled in the art.

Figure 4:
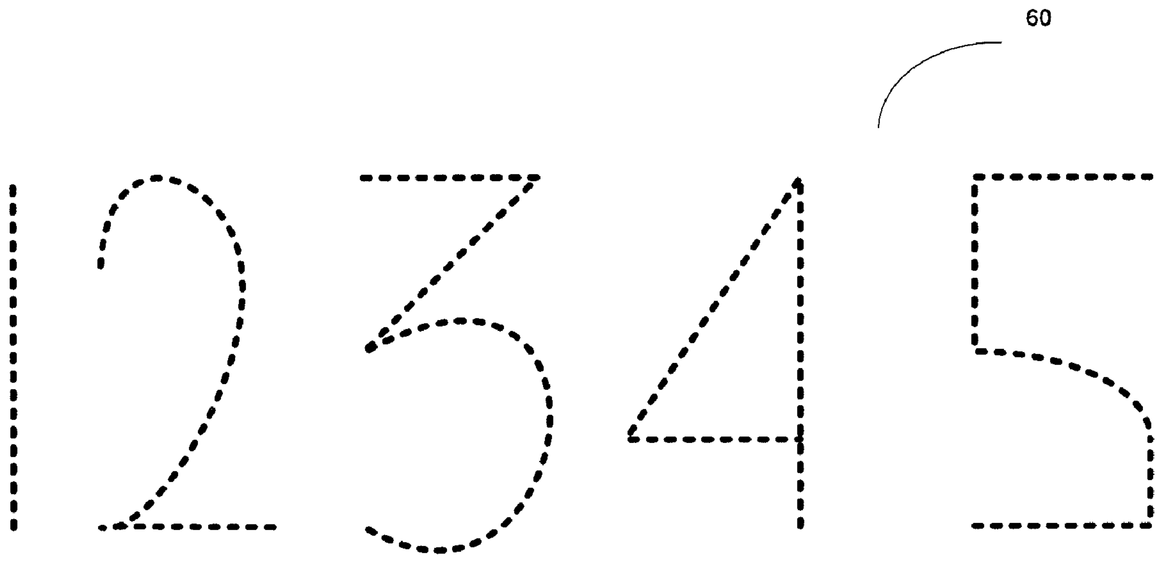
FIG. 4 is an enlarged view of the a security feature of FIG. 3B in accordance with a second embodiment.

To make the laser etched security feature 70, the ID document 10 (which can be a "finished" document, e.g., all laminates, processes, etc. already applied to the document) is subjected to an ablative laser, such as a solid state $CO_2$ laser, that etches a pattern (e.g., security feature) onto its surface. Of course, other lasers may be suitable employed for such etching. FIG. 4 illustrates the security feature 60 that was laser etched into the surface of identification document 10.

Figure 5:
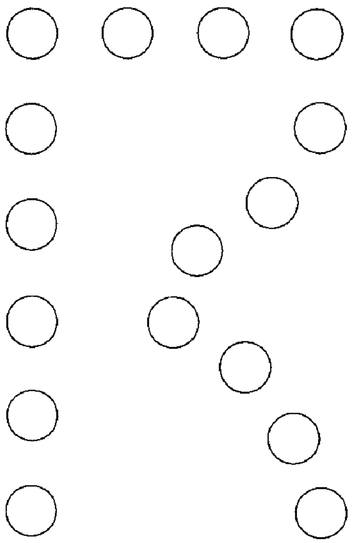
FIGS. 5A and 5B are enlarged views of two illustrative examples of laser etching, in accordance with one embodiment.
Figure 5:
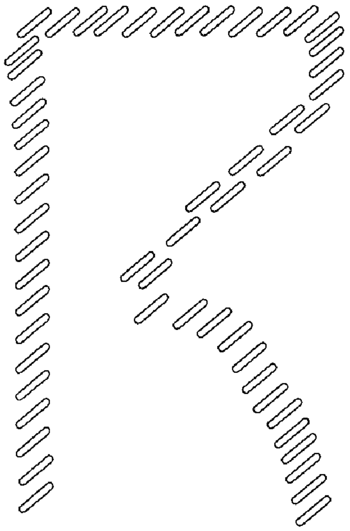
Figure 6:
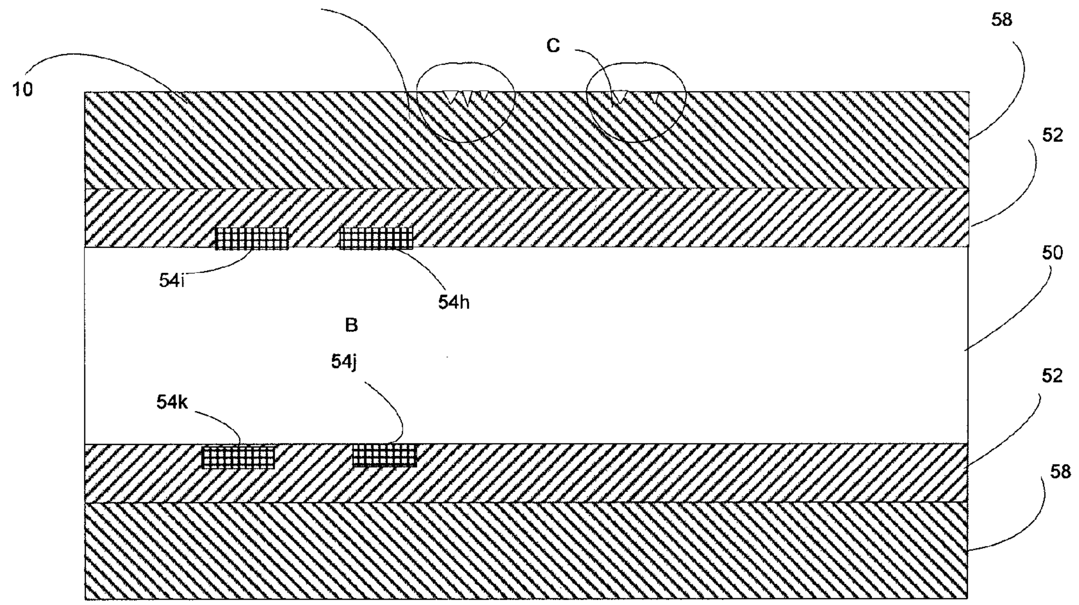
FIG. 6A is an illustrative cross sectional view of the identification document of FIG. 3A taken along the A-A line.
FIG. 6B is a close up view of section B of FIG. 6A.
FIG. 6C is a close up view of section C of FIG. 6A.
Figure 6:
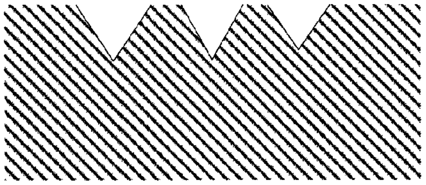
Figure 6:
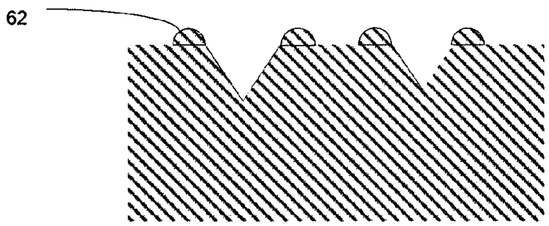

In at least one embodiment, the pattern includes a sequence of small holes, ridges, slits, etc. that form the desired text or design. For example, FIGS. 5A and 5B are two illustrative examples of patterns of holes (FIG. 5*a*) and ridges (FIG. 5B) that a laser can etch into the surface of a substrate (the patterns are shown as they appear when viewed at an appropriate angle. FIG. 6A is illustrative cross section of the identification document 10 of FIG. 3A-B, showing an exemplary pattern of engraving. FIG. 6A further illustrates information 54*h*-54*l*, formed in a layer 52 that is disposed between an overlaminate 58 and the core layer 50. The information 54*h*-54*l* can be formed by any known means, including, many different types of conventional printing and also laser marking.

As those skilled in the art will appreciate, the laser can be focused at a specific setting to produce holes of a predetermined diameter, depth and spacing. This etching process creates a pattern that can be tactile or non-tactile, but is not readily visible when seen straight on (e.g., the pattern is visible only in low angle reflected light). For example, FIG. 6B is an enlarged view of section B in FIG. 6A, showing a non-tactile pattern.

In an alternate embodiment, our technology is used to create a tactile and/or non-OVD pattern by adjusting the hole depth and area location of the laser engraving. FIG. 6C is an enlarged view of section C in FIG. 6A, showing a tactile pattern with raised edges 62. Even in this alternative implementation, the feature cannot be photocopied.

Our technology can be used to impart either fixed or variable data onto the document's surface. Because the imparted laser pattern can lie below the document's surface, there is little or no impact on wear during the document's useful life. Additionally, in at least one embodiment, the laser can be controlled by a computer (or other automated process) and linked to a continuous information and document production control process, to prevent impact on throughput or quality on the overall document production process, since the laser etching speed is typically greater than or equal to the card production speed.

We note that some materials are difficult to laser engrave even with text information. For example, some materials, such as silica filled polyolefin, TESLIN, polycarbonate and fused polycarbonate, polyethylene, polypropylene (PPRO), polystyrene, polyolefin, and copolymers are not very sensitive to laser radiation and thus are not especially conducive to laser engraving. We expressly contemplate that the teachings of at least the following commonly assigned patent applications and their progeny can be used in combination with the teachings of the instant application, to improve the laser engraving process:

Sensitizing Materials For Laser Engraving (Application No. 60/344,677, filed Dec. 24, 2001); and Laser Engraving Coating System (Application No. 60/344,675, filed Dec. 24, 2001).

Illustrative examples of ID document materials which can be etched in accordance with at least some embodiments include (but are not limited to) polyester, polycarbonate (PC), fused polycarbonate, polyvinyl chloride (PVC), polyethylene, thermosets, thermoplastic and thermoplastic resins (including those that foam when heated), engineering thermoplastics (ETP), polyurethane, polyamides, expanded polypropylene (EPP), polypropylene, acrylonitrile butadiene styrene (ABS), ABS/PC and ABS/PC products, high impact polystyrene (HIPS), polyethylene terephthalate (PET), PET-G, PET-F, polybutylene terephthalate (PBS), acetal copolymer (POM), and polyetherimide (PEI), polymer, copolymer, polyester, amorphous polyester, polyolefin, silicon-filled polyolefin, TESLIN, foamed polypropylene film, polystyrene, polyacrylate, poly(4-vinylpyridine, poly(vinyl acetate), polyacrylonitrile, polymeric liquid crystal resin, polysulfone, polyether nitride, and polycaprolactone, as well as virtually any known plastic or polymer. Of course, it will be appreciated that embodiments have applicability for the laser engraving and/or marking of plastic materials used to make many different articles formed by virtually any known method, including molding and extruding.

It is expressly is contemplated that the laser etching methods taught herein can be used with any layer (e.g., of a laminate) that is affixed (e.g., by adhesive, lamination, chemical reaction, etc.) to virtually any product, to enable the laminate to be laser etched as taught therein. We further believe that at least some of the laser etching methods taught herein have applicability to the manufacture many different articles that can be marked with a security pattern, a tactile pattern, and/or an optically variable indicia, including but not limited to identification documents, identification cards, credit cards, prepaid cards, phone cards, smart cards, contact cards, contactless cards, combination contact-contactless cards, proximity cards (e.g., radio frequency (RFID) cards), electronic components, tags, packaging, containers, building materials, construction materials, plumbing materials, automotive, aerospace, and military products, computers, recording media, labels, tools and tooling, medical devices, consumer products, and toys. Further, we contemplate that entire articles of manufacture could be formed wholly or partially using a material that contains the laser enhancing additive and then laser engraved or marked.

In addition, the laser engraving facilitated by the present technology can be used to add a digital watermark to any indicia printed (whether conventionally or by laser engraving) on any layer of the ID document 10. Digital watermarking is a process for modifying physical or electronic media to embed a machine-readable code therein. The media may be modified such that the embedded code is imperceptible or nearly imperceptible to the user, yet may be detected through an automated detection process. The code may be embedded, e.g., in a photograph, text, graphic, image, substrate or laminate texture, and/or a background pattern or tint of the photo-identification document. The code can even be conveyed through ultraviolet or infrared inks and dyes.

Digital watermarking systems typically have two primary components: an encoder that embeds the digital watermark in a host media signal, and a decoder that detects and reads the embedded digital watermark from a signal suspected of containing a digital watermark. The encoder embeds a digital watermark by altering a host media signal. To illustrate, if the host media signal includes a photograph, the digital watermark can be embedded in the photograph, and the embedded photograph can be printed on a photo-identification document. The decoding component analyzes a suspect signal to detect whether a digital watermark is present. In applications where the digital watermark encodes information (e.g., a unique identifier), the decoding component extracts this information from the detected digital watermark.

Several particular digital watermarking techniques have been developed. The reader is presumed to be familiar with the literature in this field. Particular techniques for embedding and detecting imperceptible watermarks in media are detailed, e.g., in Digimarc's U.S. patent application Ser. No. 09/503,881 (now U.S. Pat. No. 6,614,914) and U.S. patent application No. 6,122,403. Techniques for embedding digital watermarks in identification documents are even further detailed, e.g., in Digimarc's U.S. patent application Ser. No. 10/094,593, filed Mar. 6, 2002, and Ser. No. 10/170,223, filed Jun. 10, 2002 (now U.S. Pat. No. 6,978,036), U.S. Provisional Patent Application No. 60/358,321, filed Feb. 19, 2002, and U.S. Pat. No. 5,841,886. Each of the above-mentioned U.S. Patent documents is herein incorporated by reference.

Concluding Remarks

Depending on the availability of lasers, identification documents manufactured in accordance with the present technology can be produced in both over the counter and central issue environments. One example of a printing device that may be usable for at least some over the counter embodiments is the DATACARD DCL30 Desktop Card Laser Personalization System, available from Datacard Group of Minnetonka, Minn.

The identification document 10 may be manufactured in any desired size. For example, identification documents can range in size from standard business card size (47.6. times.85.7 mm) up to identification booklet documents (127. times.177.8 mm), and can have thicknesses in the range of from about 0.3 to about 1.3 mm. At least some identification documents produced in accordance with embodiments of the present technology conform to all the requirements of ISO 7810, 1985 and will thus be of the CR-80 size, 85.47-85.73 mm wide, 53.92-54.03 mm high and 0.69-0.84 mm thick. The comers of such CR-80 documents are rounded with a radius of 2.88-3.48 mm.

Further, while some of the examples above are disclosed with specific core components (e.g., TESLIN), we note that our compositions, methods, articles, features, and processes can be applied to other core-based identification documents as well, including those documents manufactured from other materials. For example, where an embodiment has shown polycarbonate or polyester as an example over-laminate, those skilled in the art will appreciate that many other over laminate materials can be used as well.

To provide a comprehensive disclosure without unduly lengthening the specification, applicants herein incorporate by reference each of the patent documents referenced previously, along with U.S. Pat. Nos. 6,022,905, 5,298,922, 5,294,774, 4,652,722, 5,824,715 and 5,633,119, and U.S. and Ser. No. 09/969,200 (now U.S. Pat. No. 6,827,277).

Having described and illustrated the principles of the technology with reference to specific implementations, it will be recognized that the technology can be implemented in many other, different, forms.

Although certain words, languages, phrases, terminology, and product brands have been used herein to describe the various features of illustrative embodiments, their use is not intended as limiting. Use of a given word, phrase, language, terminology, or product brand is intended to include all grammatical, literal, scientific, technical, and functional equivalents. The terminology used herein is for the purpose of description and not limitation.

The technology disclosed herein can be used in combination with other technologies. Examples include the technology detailed in U.S. Pat. Nos. 6,827,277 and 6,923,378. Also, instead of ID documents, the present techniques can be employed with product tags, product packaging, business cards, bags, charts, maps, labels, etc., etc., particularly those items including engraving of an over-laminate structure. The term ID document is broadly defined herein to include these tags, labels, packaging, cards, etc The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the technology as claimed. Accordingly, the foregoing description is by way of example only and is not intended as limiting. The technology's scope is defined in the following claims and the equivalents thereto.

It will be recognized that all of the patent application documents mentioned above are readily available to the public from the US Patent Office, through its online Patent Application Information Retrieval (PAIR) system.

Having described and illustrated the principles of the technology with reference to specific implementations, it will be recognized that the technology can be implemented in many other, different, forms.

Although certain words, languages, phrases, terminology, and product brands have been used herein to describe the various features of certain embodiments, their use is not intended as limiting. Use of a given word, phrase, language, terminology, or product brand is intended to include all grammatical, literal, scientific, technical, and functional equivalents. The terminology used herein is for the purpose of description and not limitation.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the technology as claimed. Accordingly, the foregoing description is by way of example only and is not intended as limiting. The technology's scope is defined in the following claims and the equivalents thereto.

The invention claimed is:

1. An article comprising an outer top layer and at least one interior layer, the article conveying one or more of invariant and personalized information, wherein at least some of the one or more of invariant and personalized information is defined by voids that extend into, but not through, the laminate layer, said voids providing a feature that can be felt by touch; and, wherein the article is one or more of: an identification document, a credit card, a phone card, a prepaid card, a smart card, a contact card, a contactless card, a RFID card, an electronic component, a package, a container, a recording media, a label, a tool, a medical device, a consumer product, a toy product, and a tag.

2. The article of claim 1 in which said voids are formed by laser- ablating the outer top layer of the article.

3. The article of claim 2 and wherein the laser- ablating forms a raised feature extending above a top surface of the outer top layer surrounding the voids and provides a tactile effect.

4. The article of claim 2 wherein the laser-ablated voids are formed using a solid state $CO_2$ laser.

5. The article of claim 1, wherein at least one layer comprises a polycarbonate.

6. The article of claim 1, wherein the article further comprises a semi-conductor device.

7. An article comprising at least one interior layer and a laminate layer above the interior layer, an outer surface of the laminate layer defining a top surface of the article, the article conveying one or more of invariant and personalized information, wherein at least some of the information is defined by laser- ablated voids that extend through the top surface of the article, and wherein at least some of said voids are defined by sidewalls that are angled obliquely, rather than perpendicularly, relative to said top surface; wherein the article is one or more of: an identification document, a credit card, a phone card, a prepaid card, a smart card, a contact card, a contactless card, a RFID card, an electronic component, a package, a container, a recording media, a label, a tool, a medical device, a consumer product, a toy product, and a tag; and, wherein said voids define a feature that can be felt by touch.

8. A method of manufacturing an article concerning information about a person, comprising:

printing information on an article core;

applying a laminate layer atop the printed article core; and laser-ablating the laminate layer to impart a tactile feature thereto, without ablating the document core, said tactile feature containing the information concerning said person; and, wherein the article is one or more of: an identification document, a credit card, a phone card, a prepaid card, a smart card, a contact card, a contactless card, a RFID card, an electronic component, a package, a container, a recording media, a label, a tool, a medical device, a consumer product, a toy product, and a tag.

9. An article comprising at least one layer of material, the top surface of the article including a laser-formed void pattern creating an indicia, the article characterized by raised features that are also laser-formed, said raised features comprising foamed material, the raised features extending above a nominal top surface level of the article to provide a tactile effect that aids in verifying the authenticity of the article; and, wherein the article is one or more of: an identification document, a credit card, a phone card, a prepaid card, a smart card, a contact card, a contactless card, a RFID card, an electronic component, a package, a container, a recording media, a label, a tool, a medical device, a consumer product, a toy product, and a tag.

10. The article of claim 9, wherein at least one layer of material comprises a polycarbonate.

11. The article of claim 9, where the article further comprises a semi-conductor device.

12. An article comprising a core layer and at least one outer laminate layer wherein the top surface of the outer laminate layer is laser-ablated to form a pattern, the pattern being substantially non visible when viewed straight on, wherein the pattern provides a feature that can be felt by touch; and wherein the laser-ablating is performed by laser etching at an angle other than approximately 90 degrees to the top surface of the outer laminate layer; and, wherein the article is one or more of: an identification document, a credit card, a phone card, a prepaid card, a smart card, a contact card, a contactless card, a RFID card, an electronic component, a package, a container, a recording media, a label, a tool, a medical device, a consumer product, a toy product, and a tag.

* * * * *

UNITED STATES PATENT AND TRADEMARK OFFICE
Certificate

Patent No. 8,083,152 B2 Patented: December 27, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: George Theodossiou, Brockton, MA (US); and Robert L. Jones, Andover, MA (US)

Signed and Sealed this Twenty-ninth Day of May 2012.

STEVEN S. PAIK
*Supervisory Patent Examiner*
Art Unit 2887
Technology Center 2800